United States Patent
Suzuki et al.

[11] Patent Number: 5,978,667
[45] Date of Patent: Nov. 2, 1999

[54] ELECTRONIC EXCHANGE SYSTEM FOR PORTABLE STATIONS

[75] Inventors: Hirokazu Suzuki, Sagamihara; Masakazu Shirakawa, Tokyo; Motohiro Nakano, Tokyo; Emi Ito, Tokyo, all of Japan

[73] Assignee: Kabushiki Kaisha Toshiba, Kawasaki, Japan

[21] Appl. No.: 08/530,488

[22] Filed: Sep. 19, 1995

[30] Foreign Application Priority Data

Sep. 20, 1994 [JP] Japan .................................. 6-225064

[51] Int. Cl.[6] .............................. H04Q 7/00; H04Q 7/20; H04Q 7/24; H04Q 7/26
[52] U.S. Cl. .......................... 455/403; 455/412; 455/550; 455/555; 455/554
[58] Field of Search .................................. 379/58, 59, 57, 379/67, 61; 455/33.1, 54.1, 403, 412, 413, 554, 555, 550, 560; 340/825.5, 825.12

[56] References Cited

U.S. PATENT DOCUMENTS 5,329,578  7/1994  Brennan et al. .......................... 379/67
5,579,372  11/1996  Astrom ...................................... 379/58
5,592,533  1/1997  McHenry et al. ......................... 379/58

FOREIGN PATENT DOCUMENTS

WO 9416532  7/1994  Finland .

Primary Examiner—Wellington Chin
Assistant Examiner—Keith Ferguson
Attorney, Agent, or Firm—Finnegan, Henderson, Farabow, Garrett & Dunner, L.L.P.

[57] ABSTRACT

An electronic exchange system comprises an electronic exchange system for private branch exchanging, multifunctional telephone sets operating as wired extension terminals, public network main lines of a public telecommunication network that are cores for connecting the central telephone electronic exchange system and said electronic exchange system, leased or private lines, cell stations, a control terminal and portable stations of radio slave units for the cell stations. If an incoming call is not forwarded to the called portable station because the portable station does not respond, the incoming call is stored in a predetermined memory arranged with the electronic exchange system, which connects the portable station and the calling terminal once the portable station restores it communicable state.

6 Claims, 17 Drawing Sheets

CALL INFORMATION STORAGE PROCESS AND INCOMING CALL
NO ANSWER DETECTION PROCESS FLOW

| CALLING AREA | CELL STATION WITHIN CALLING AREA |
|---|---|
| CA - A | 250-1, 250-2 ⋯ 250-a |
| CA - B | 250-a+1, ⋯ 250-b |
| ⋮ | ⋮ |
| CA - F | 250-e+1, ⋯ 250-f |

FIG. 9

| PORTABLE STATION | NO RESPONSE | EXTENSION NUMBER | TIME | EXTENSION NUMBER | TIME |
|---|---|---|---|---|---|
| 270-1 | PRESENT | 4000 | 3/3 10:00 | 3000 | 3/3 12:00 |
| 270-2 | ABSENT | — | — | — | — |
| 270-j | ABSENT | — | — | — | — |
| 270-k-2 | PRESENT | 4001 | 3/3 15:00 | — | — |
| ⋮ | ⋮ | ⋮ | ⋮ | ⋮ | ⋮ |
| 270-k | ABSENT | — | — | — | — |

FIG. 10

CALL INFORMATION STORAGE PROCESS AND INCOMING CALL NO ANSWER DETECTION PROCESS FLOW

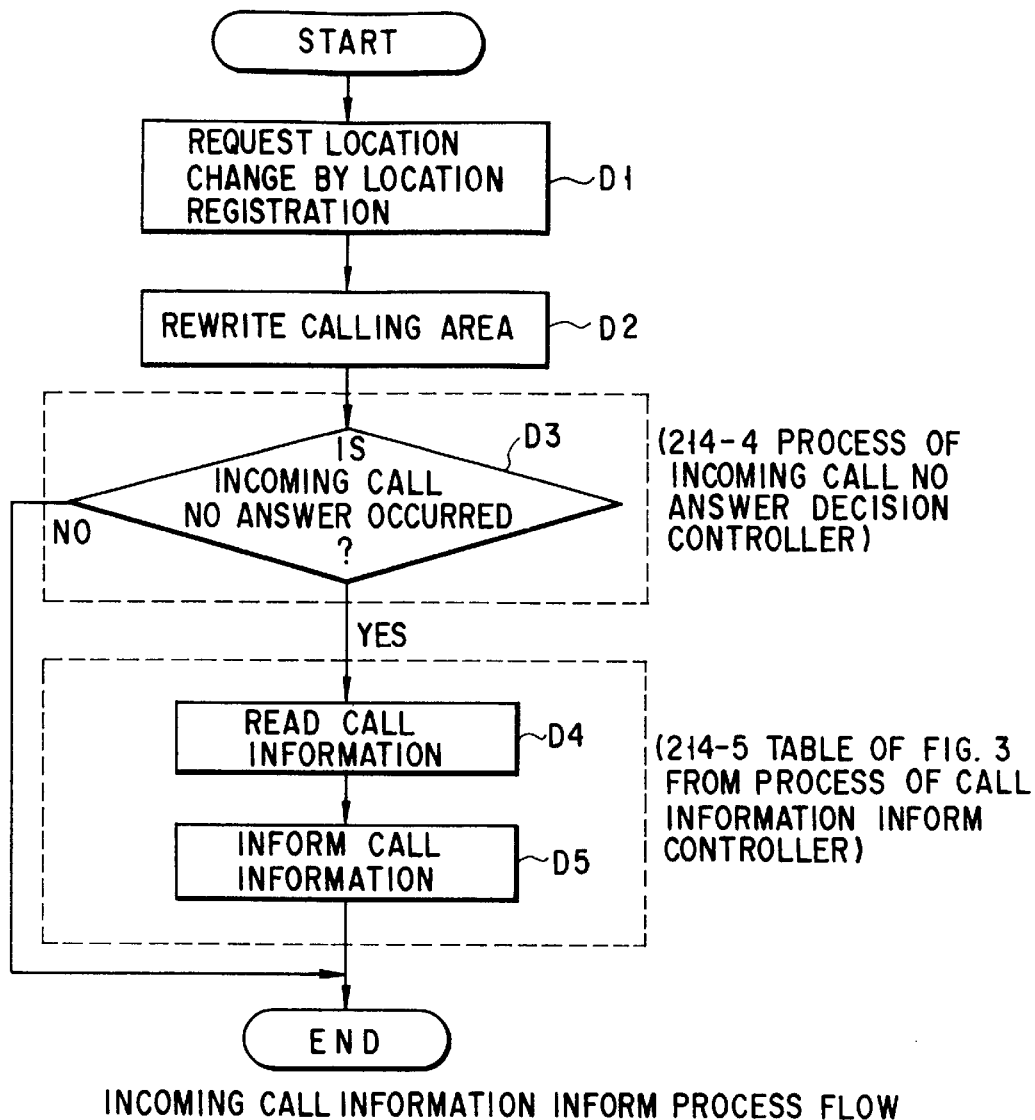
FIG. 12 INCOMING CALL INFORMATION INFORM PROCESS FLOW
FIG. 13 DISPLAY EXAMPLE OF CALL INFORMATION OF PORTABLE STATION

| NUMBER OF CALLING PARTY | CALL TYPE | SERVICE CLASS | CALLING PARTY NAME |
|---|---|---|---|
| 3000 | EXTENSION | B | SUZUKI |
| 73433001 | PRIVATE LINE | A | NAKANO |
| 0854005 | CENTRIZED OFFICE LINE | EXCELLENT | ITO |
|  |  |  |  |

```
LOCATION REGISTRATION END           8/11  13:00
<INCOMING HISTORY>
                         CALLING
         CALLING PARTY   PARTY      AGENT
  TIME       NUMBER      NAME       RESPONDER
8/11 11:30  0854005      ITO
8/11 11:04  73433001     NAKANO
8/11 10:00  3000         SUZUKI     4000
<#> : NEXT PAGE                     <END> : END
```

FIG. 18

```
LOCATION REGISTRATION END           8/11  13:00
<INCOMING HISTORY>
         CALLING PARTY   AGENT
  TIME       NUMBER      RESPONDER
8/11 10:00  3000         4000
8/11 11:04  73433001
8/11 11:30  0854005
<#> : NEXT PAGE                     <END> : END
```

FIG. 19

```
LOCATION REGISTRATION END           8/11  13:00
<INCOMING HISTORY>
         CALLING PARTY   AGENT
  TIME       NUMBER      RESPONDER
8/11 10:00  3000         4000
8/11 11:45  3000
8/11 11:04  73433001
<#> : NEXT PAGE                     <END> : END
```

FIG. 20

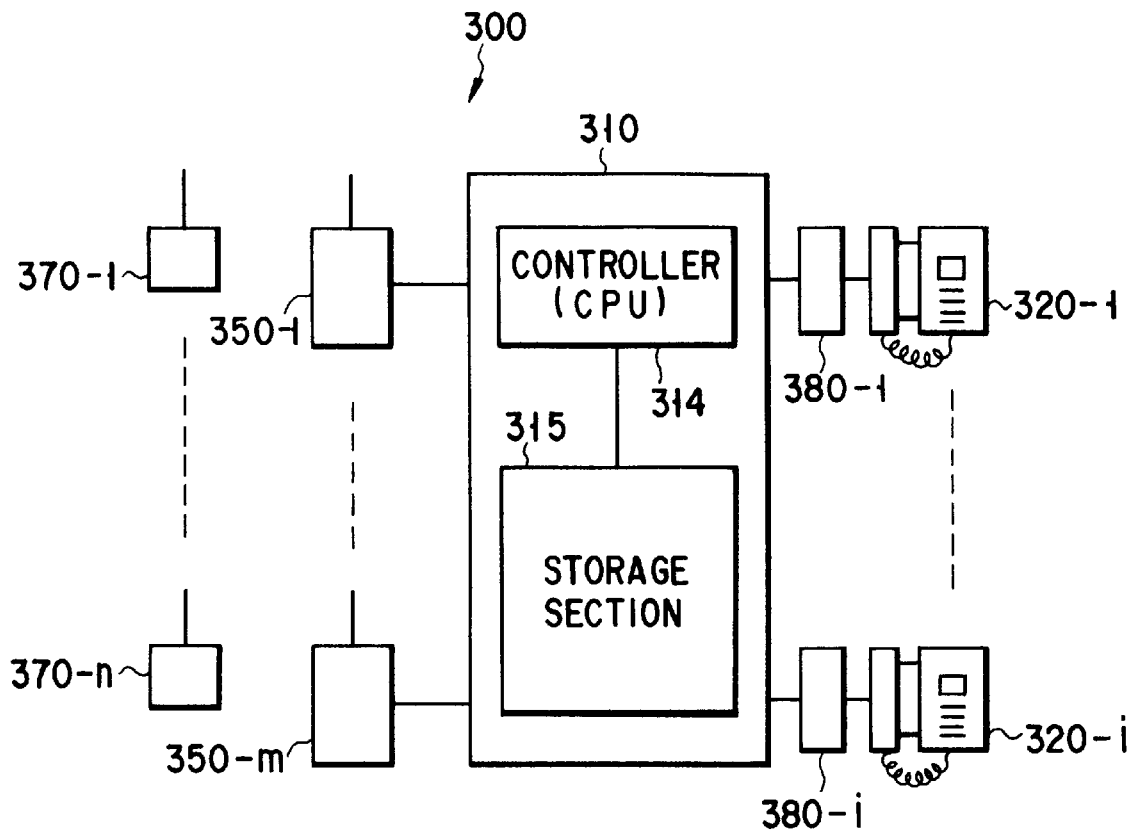
F I G. 21
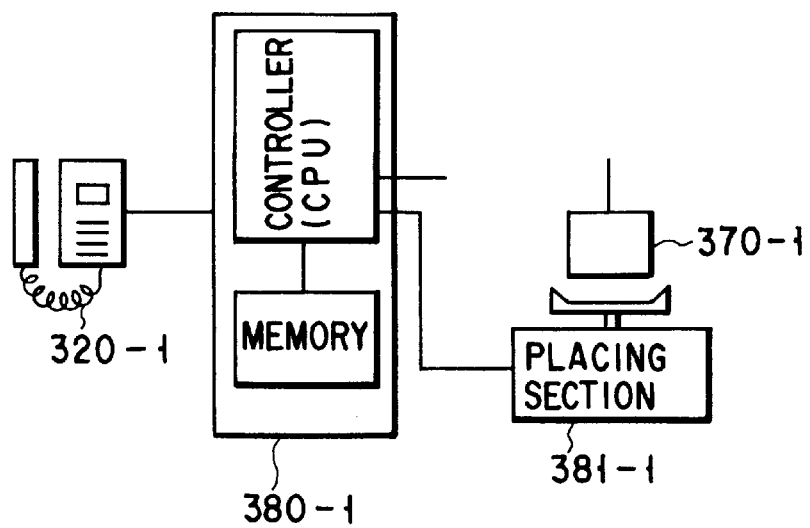
F I G. 22

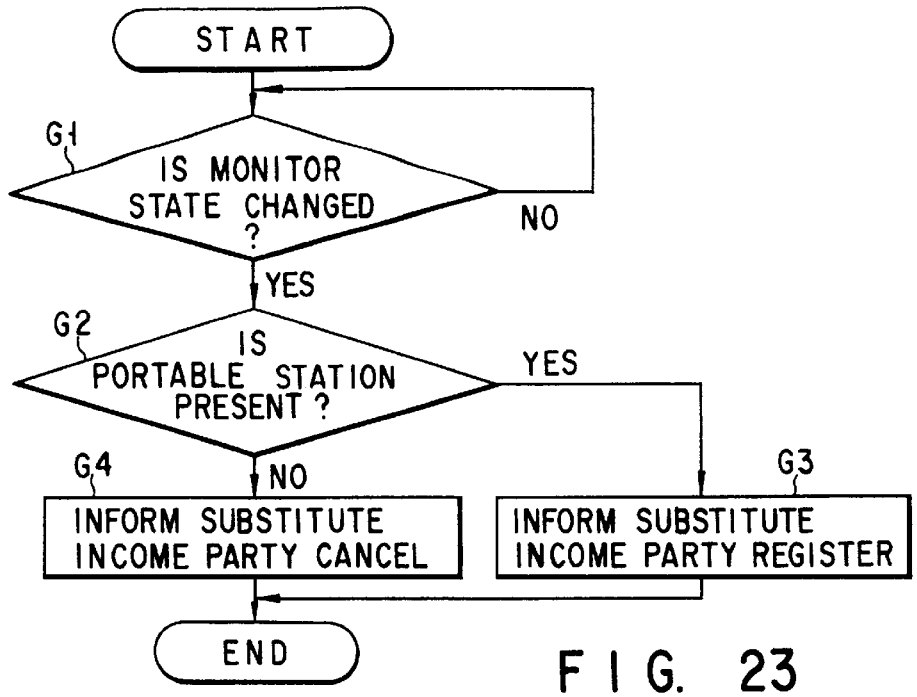
FIG. 23
| PORTABLE STATION NUMBER | PRESENT INFOWORLD | SUBSTITUTE INCOME PARTY NUMBER |
|---|---|---|
| 2000 | PRESENT | 5000 |
| 2001 | ABSENT | 6000 |
| ⋮ | ⋮ | ⋮ |
FIG. 24
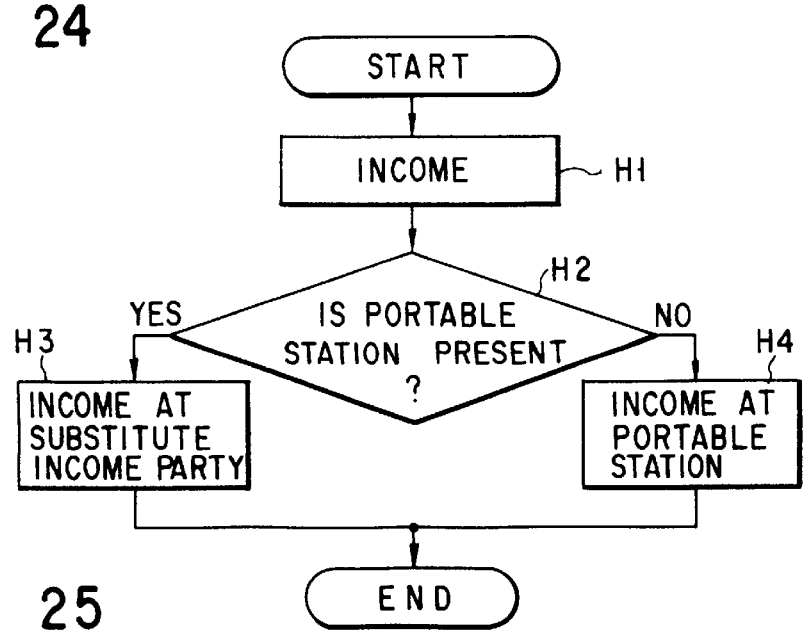
FIG. 25

| NUMBER OF TIMES | TIMER VALUE |
|---|---|
| LESS THAN FIVE | 15 [s] |
| MORE THAN FIVE | 5 [s] |
| 10 OR MORE | 0 [s] |
← STANDARD VALUE
※ INCOMING AT PORTABLE STATION IS NOT EXECUTED WITH TIMER VALUE "0" [s], BUT IMMEDIATELY OUTER PROCESS IS EXECUTED.
F I G. 26
| PORTABLE STATION NUMBER | NUMBER OF NO ANSWERS |
|---|---|
| 1 0 0 0 | 0 |
| 1 0 0 1 | 1 |
| : | : |
| 1 0 1 0 | 5 |
| 1 0 1 1 | 10 |
F I G. 27
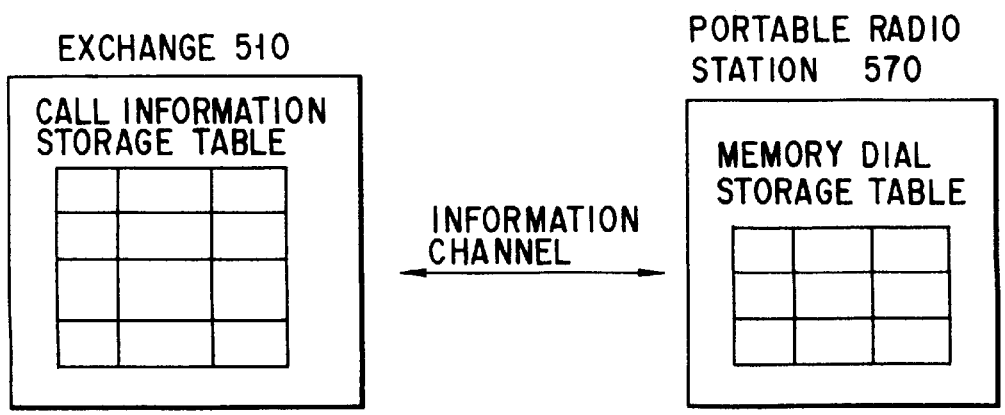
F I G. 30

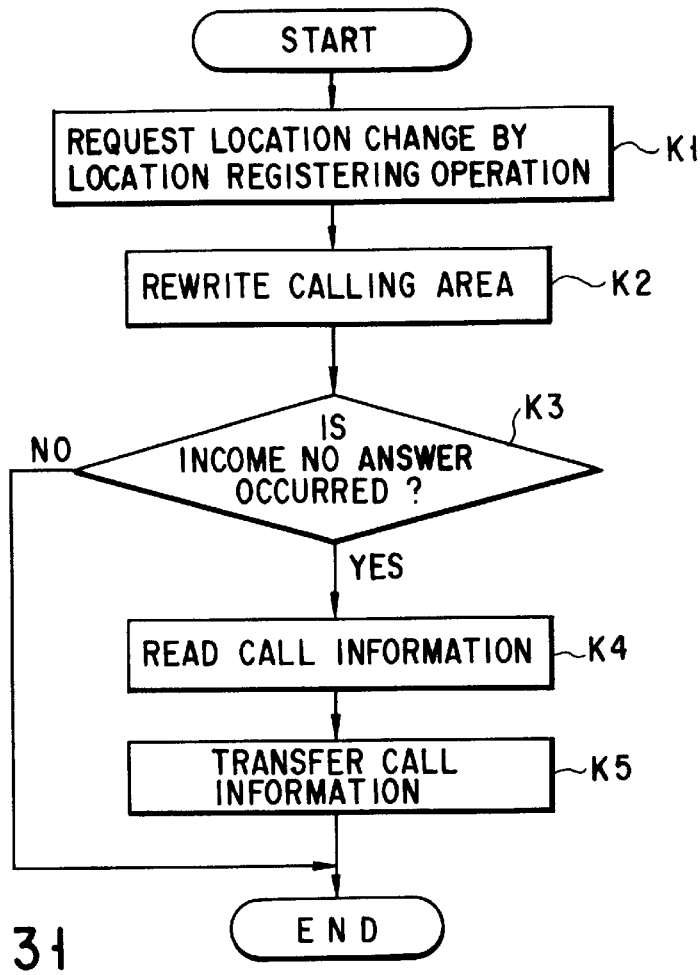
FIG. 31
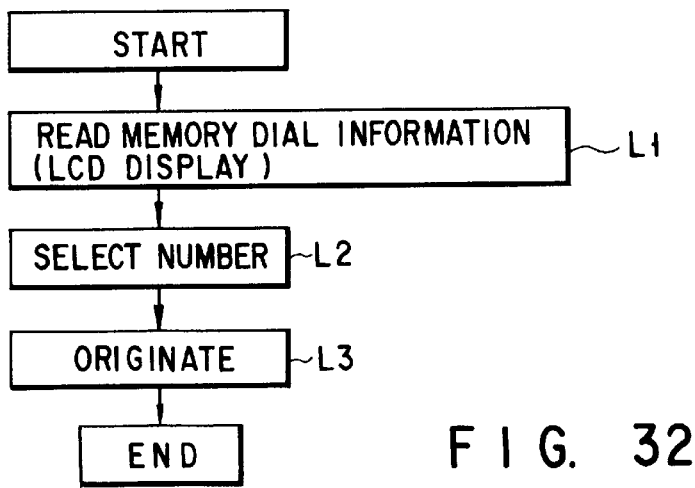
FIG. 32
FIG. 33

ELECTRONIC EXCHANGE SYSTEM FOR PORTABLE STATIONS

BACKGROUND OF THE INVENTION

1. Field of the Invention

This invention relates to an electronic exchange system for a plurality of portable stations such as portable telephone sets and, more particularly to an electronic exchange system capable of suitably controlling a portable station which does not reply to a call request.

2. Description of the Related Art

An electronic exchange system is a product of recent technological development in the field of electronics. It is highly intelligent and capable of executing sophisticated programs under the control of a central processing unit and hence can provide a number of different services other than exchange operations ordinary assigned to it. In recent year, there are available electronic exchange system that can connect not only wired terminals but also portable stations such as radio telephone sets.

In an electronic exchange system capable of exchanging a plurality of portable stations as well as a plurality of wired terminals, cell stations that operate as base stations for the portable stations are provided. The electronic exchange system communicates with a selected portable station via one of the cell stations. The cell stations are typically located at predetermined positions on the ground and provide telephone service for predetermined respective service areas, or calling areas, of the exchange so that any portable station located within that areas can communicate with the electronic exchange system. Consequently, a portable station located within the calling areas can originate a call to or be received a call from a wired terminal connected to the electronic exchange system or a portable station via one of the cell stations to establish a telecommunication channel between them.

Normally, a specific telephone number is assigned to each portable station and the electronic exchange system periodically checks the location of each portable station to find out in which one of the plurality of predetermined service zones, or calling areas, it is currently located. If there is an incoming call to a portable station, the electronic exchange system causes one of the cell stations in which service zone the called portable station is located, thereby calling the portable station. If the portable station responds to the call, the electronic exchange system sets up a telecommunication channel between the calling terminal and the called portable station so that the calling party and the called party can communicate with each other.

In order for the electronic exchange system to detect in which one of the calling areas of the electronic exchange system a portable station is located, the electronic exchange system periodically (or constantly) sends a response request command to each portable station and checks which cell station receives the response of the portable station. In addition, the electronic exchange system can also locate a specific portable station when the portable station sends a connection request by seeing which one of the cell stations receives the connection request. Normally, since a specific telephone number is assigned to each portable station, the portable station to which a response command is sent can be identified if the response from the portable station contains its telephone number. In recent years, however, with a digital system such as a PHS (personal handy phone system), each portable station sends a location registration request each time it moves from one calling area into another so that the electronic exchange system can locate the portable station when it receives the location registration request.

Thus, a conventional electronic exchange system for the cell stations and the portable stations, detects a position of all the portable stations controls data concerning their locations (location data). When a portable station is called, it identifies the calling area where the called portable station is located on the basis of the location data it has and transmits a call signal to the called portable station via the cell station of the identified calling area so that the called portable station is informed of the call.

However, if the called portable station is out of power (turned off) or it is out of the calling areas, that is it has moved out of the entire service area of the exchange system, it cannot respond to the call.

In such a case, the called portable station cannot ringing so that the user of the portable station cannot recognize the incoming call by any means. Consequently, as no telecommunication channel is established between the calling party and the called party, the calling party may eventually give up the call and feel unpleasant since he or she does not use a portable station.

Such a problem is attributable to the fact that the electronic exchange system does not store nor control any data on a call request if the called portable station does not send a response signal in return to the call request or if it cannot communicate with the electronic exchange system. As the electronic exchange system does not store nor control any data on the unsuccessful call request, it cannot send any information on the call request to the called portable station for ever because the exchange system is not adapted to handle such an abortive call if the called portable station does not send back a response signal.

Subscribers owning portable stations may be forced to turn off the terminals for some reason or another. They may forget to turn them on again or the batteries of the power sources of the terminals may run out without being recognized by the owners. More often than not, the subscribers may move out of the entire service area of the exchange system in the course of their daily behaviors. If they end up without recognizing incoming calls made to them, the better part of the benefit of owning such portable stations may be lost.

Thus, if the electronic exchange system calls a portable station and the called portable station does not send back a response signal to the electronic exchange system, the electronic exchange system does not store nor control any data on the unsuccessful call and therefore the subscriber who owns the portable station cannot recognize the call for ever. There may be may occasions where portable stations cannot send back a response signal to the electronic exchange system even if there is a call. So, while a portable station may be beneficial because of its handiness and portability, the high probability of abortive calls can significantly reduce this benefit.

Therefore there is a good reason to expect an electronic exchange system to be so adapted, if there is an unsuccessful call because of an inoperative condition of the called portable station and the terminal restores its operable condition, as to notify the calling terminal of the restored operable condition of the called portable station.

Additionally, conventional exchange systems are not provided with a functional feature of automatically searching and selecting an available channel for a called portable station if a specific channel assigned to it is busy. Since the number of channels of a radio communication is limited, the channel can more often be busy as the number of portable stations allocated to the channel increases so that a call may frequently end up in failure because the channel is busy.

In a private branch exchange system, subscribers of portable stations may normally be seated in the office and not a few wired extension telephone sets may be at hand to make the portable stations useless unless the portable stations and the wired extension telephone sets are made compatible without requiring cumbersome exchange operations. This may provide another reason that reduces the benefit of an electronic exchange system for portable stations. Furthermore, an opposite case in which it is easy to connect calling party with the portable station of the called party in place of the wired extension terminal may be occurred.

SUMMARY OF THE INVENTION

It is therefore the object of the present invention to provide an electronic exchange system that can provide improved service to both the calling party and the called party who owns a portable station if a call ends up in failure.

According to a first aspect of the invention, there is provided an electronic exchange system comprising a plurality of portable stations, determination means for determining an unsuccessful call to any of the plurality of portable stations, memory means for storing data on the call determined to be unsuccessful by the determination means for the plurality of portable stations, the data indicating the calling party, detection means for checking the communicable state of each of the plurality of portable stations and control means for carrying out a control operation in accordance with the call data for each of the portable stations checked for the communicable state depending on the outcome of checking the communicable state.

In an electronic exchange system according to the first aspect of the invention, if the memory section stores data on a call to the portable station checked by the detection section, the control section connects the checked portable station and the calling terminal indicated by the call data.

With the above arrangement, if the electronic exchange system transmits a call signal to the called portable station and does not receive a response signal from the called portable station within a predetermined period of time, the called portable station is connected when the first service is provided to the portable station after the unsuccessful call so that a prolonged incommunicable state on the part of the called portable station can be avoided to improve the overall service of the exchange system to which the called portable station belong.

In an electronic exchange system according to the first aspect of the invention, wherein, if the memory section stores the call data on the portable station checked by the detection section, the control section notifies the checked portable station of the call data.

In an exchange system as described above, each of the plurality of portable stations comprises a memory and section for transmitting a signal to the terminals having the respective telephone numbers stored in the dial memory and each of the portable stations checked by the detection section stores the call data transmitted from the control section in its own memory.

With the above arrangement, if the electronic exchange system transmits a call signal to the called portable station and does not receive a response signal from the called portable station within a predetermined period of time, data on the unsuccessful call are sent to the called portable station when the first service is provided to the portable station after the unsuccessful call so that a prolonged incommunicable state on the part of the called portable station can be avoided to improve the overall service of the exchange system to which the called portable station belong.

Additionally, the called portable station can share the data stored in the memory of the electronic exchange system so that the subscriber who owns the called portable station can call back the calling party of the abortive call at any appropriate time. Thus, each of the portable stations of the exchange system can call back the calling party of an unsuccessful call at any appropriate time, if any, by using the directory call function, the memory dial call function or some other function the terminal is originally provided with to remarkably improve the service offered to the subscribers.

According to a second aspect of the invention, there is provided an exchange system comprising a plurality of portable stations, a plurality of wired terminals, each of the wired terminals having a unit adapted to carry one of the portable station thereon and determination means for determining if the unit carries the portable station, memory means for storing the result of determination of the determining means for each of the portable stations and data indicating each of the wired terminals having a unit determined to be carrying a portable station as transfer data and control means for controlling incoming calls to any of the plurality of portable stations according to the transfer data for the called portable stations.

With the above arrangement, the location of each of the portable stations of the exchange system is automatically detected and the exchange system is notified of it so that, when a portable station is called, the called portable station or a corresponding wired telephone set is automatically selected for connection. Thus, the subscriber who owns the portable station and the wired telephone, or who owns only the portable telephone is provided with improved service by easily connecting in response to a termination request.

According to a third aspect of the invention, there is provided an exchange comprising a plurality of portable stations, determination means for transmitting an incoming call signal in response to an incoming call to any of the plurality of portable stations and determining a no response situation if the called portable station does not respond within a waiting time, memory means for storing the number of times of no response situations determined by the determination means for each of the plurality of portable stations, control means for executing a control program for each no response situation determined by the determination means for the calling portable station and alteration means for altering the waiting time as a function of the number of times of no response situations stored in the memory means for each of the plurality of portable stations.

With the above arrangement, if a called portable station does not respond because it is out of the entire service area of the exchange system or because the called portable station is turned off, the time until a program for an out-of-service-area situation is executed is curtailed so that the calling portable station is provided with improved service.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention in which:

FIG. 9 is a schematic illustration showing the relationship between a cell station and calling areas of the electronic exchange system of FIG. 8;

FIG. 10 is a schematic illustration of a call data memory table that can be used for the electronic exchange system of FIG. 8;

FIG. 12 is a flow chart showing a control operation of the electronic exchange system of FIG. 8 when a portable station restores its communicable state;

FIG. 13 is an example of call data on a portable station of the electronic exchange system of FIG. 8 when the portable station restores its communicable state;

FIG. 18 is a schematic illustration of data that can be displayed on the display section of a portable station according to the class of service provided thereto in the modified second embodiment of electronic exchange system of the invention;

FIG. 19 is a schematic illustration of data that can be displayed on the display section of a portable station according to the time of day of a received call in the modified second embodiment of electronic exchange system of the invention;

FIG. 20 is a schematic illustration of data that can be displayed on the display section of a portable station according to the number of times of received calls in the modified second embodiment of electronic exchange system of the invention;

FIG. 21 is a block diagram showing the entire configuration of the third embodiment of electronic exchange system according to the invention;

FIG. 22 is a block diagram of the location detector of a portable station of the electronic exchange system of FIG. 21;

FIG. 23 is a flow chart showing the operation of the location detector of a portable station illustrated in FIG. 22;

FIG. 24 is a substitution destination table showing the presence or absence of data on the portable stations and their substitution terminals for calls to them stored in the electronic exchange system of FIG. 21;

FIG. 25 is a flow chart showing the operation of the electronic exchange system for selecting a portable station or its substitution terminal of the electronic exchange system of FIG. 21;

FIG. 26 is a table showing the periods of time before executing an out-of-service-area program that can be used for the fourth embodiment of electronic exchange system;

FIG. 27 is a table showing the numbers of times of no response situations for the portable stations that can be used for the fourth embodiment of electronic exchange system;

FIG. 30 is a conceptual illustration showing how the call data stored in the memory of the electronic exchange system is transmitted from a portable station to another in the fifth embodiment of electronic exchange system according to the invention;

FIG. 31 is a flow chart showing the operation of the electronic exchange system including transfer of call data from the electronic exchange system to a portable station of the fifth embodiment of electronic exchange system according to the invention;

FIG. 32 is a flow chart showing a calling operation of a portable station using a memory dial of the fifth embodiment of electronic exchange system; and FIG. 33 is a set of data that can be displayed constantly on the display section of a portable station as a result of the operation of FIG. 32.

DETAILED DESCRIPTION OF THE PREFERRED EMBODIMENTS

First to fifth embodiments according to the present invention will be explained with reference to the accompanying drawings.

Referring to FIGS. 1 to 7, an electronic exchange system according to the first embodiment of the present invention will be described. This electronic exchange system comprises an automatic calling-back function for storing a termination call in a predetermined memory in an electronic exchange system when the terminal call cannot be connected to a portable station since there is incoming call no answer from the portable station and enabling talking by connecting the portable station to a calling originator of the call by the electronic exchange system when a communication with the portable station is enabled.

Figure 1:
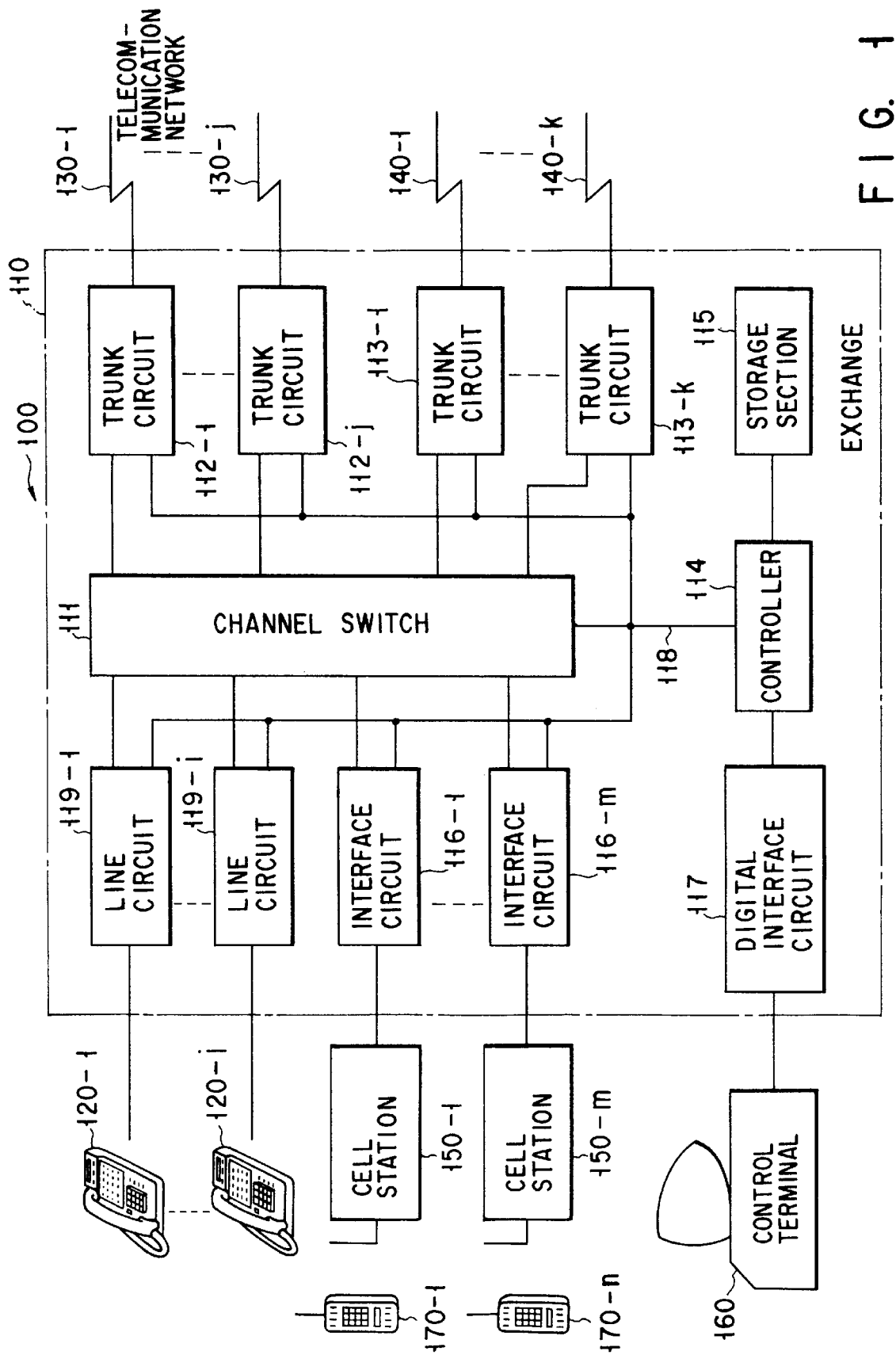
FIG. 1 is a block diagram showing the entire configuration of the first embodiment of electronic exchange system according to the invention.

A fundamental structure of the electronic exchange system according to the first embodiment is illustrated in FIG. 1. As illustrated in FIG. 1, this electronic exchange system 100 comprises a private branch electronic exchange system (PBX) 110, multi-function telephones 120 (120-1 to 120-i) of wired extension terminals, public telecommunication network 130 (130-1 to 130-j) of cable conductors for connecting a central telephone electronic exchange system to the electronic exchange system 110, leased lines or private lines 140 (140-1 to 140-k), cell stations 150 (150-1 to 150-m), a control terminal 160, and portable stations 170 (170-1 to 170-n) of radio slave units for the cell stations, where i, j, k, m and n are arbitrary real numbers. The control terminal 160 has a data input unit such as a keyboard or the like and a display, and inputs data and program to the electronic exchange system 110 or reads the data. The electronic exchange system 110 executes various processes including exchanging, connections among extension terminals of the telephone 120 and the portable station 170, the public telecommunication network 130 and the private line 140 such as, for example, between extensions or between the extension and a centerized office line. This electronic exchange system 110 comprises, as illustrated in FIG. 1, a channel switch 111, trunk circuits 112 (112-1 to 112-j), 113 (113-1 to 113-k), a controller 114, a storage section 115, interface circuits 116 (116- to 116-m), a digital interface circuit 117, a control data high-way 118 and line circuits 119 (119-1 to 119-i).

The channel switch 111 electronic exchange systems and connects between the extensions, from the extension to the wire line (the public telecommunication network, the private line), or from the centerized office line to the extension. More specifically, the channel switch 111 so electronic exchange systems as to form the channel between the trunk circuits 112 and 113, the interface circuit 116, the line circuit 119 under the control of the control section 114. This channel switch 111 has a time switch and a PCM (pulse code modulation) high-way. The PCM high-way is a transmission line for transmitting voice signal data delivered between the trunk circuits 112 and 113, the interface circuit 116, the line 119 in a predetermined time slot corresponding to the other party, and the time switch controls to time divide inputting/outputting timing of the data to the PCM high-way of the line circuit 119 and the trunk circuits 112, 113 corresponding to the time slot. The time switch is operated under the control of the controller 114. A tone oscillator is connected to the channel switch 111 and sends various signal sounds necessary for a telephone system.

The controller 114 variously controls not only exchanging process of the channel switch 11 but also the entire electronic exchange system 110. The line circuit 119 is a connecting interface for connecting the extension terminal 120 to the electronic exchange system 110.

The trunk circuits 112 and 113 are circuits for interfacing the channel switch 111 with the corresponding public telecommunication network 130, the leased wire or the private line 140, and further circuits for closing a DC loop for detecting incoming or line acquisition. The line circuits 119 are connecting interfaces between the channel switch 111 and the respective extension terminals. The portable station interface circuit 116 is an interface between the electronic exchange system 110 and the cell station 150.

A circuit for controlling the terminals of the trunk circuits 112, 113, the interface circuit 116, the line circuit 119 and the digital interface circuit 117 delivers a signal to the controller 114 via the control data high-way 118. The terminal control circuits are allocated to input/output ports of the electronic exchange system 110, and decoding sections for detecting own port numbers are so provided as to terminal-designate by port numbers for specifying the input/output ports. When the port number decoded by the decoding section coincides with the number allocated to the own port number, a request for accessing to the own port number is recognized.

The storage section 115 stores various control programs and various tables of the controller 114, and data such as set functional contents. The storage section 115 further holds various information generated in the electronic exchange system 110 such as, for example, programs for updating various information such as number information of call-out extension, its talking time, number of speeches, number of call-out to the centerized office line, telephone number, talking time, talking tariff of calling originator, present state, programs for controlling data delivery to the control terminal 160.

The digital interface circuit 117 is an interface for connecting the electronic exchange system 110 to an external digital unit. The control terminal 160 is connected to the controller 114 through the digital interface circuit 117. The digital interface circuit 117 is an interface which can transmit data at a high speed. The control terminal 160 communicates with the controller 114 of the electronic exchange system 110 through the digital interface circuit 117.

The above-described constituents provided in the electronic exchange system 110 are connected to the controller 114 through the control data high-way 118. The controller 114 so controls the various constituents as to form channels between the line circuit 119 and the trunk circuits 112, 113 according to the control program previously stored in the storage section 115, and can execute an ordinary exchanging operation. To realize such controls, the storage section 115 holds programs and data for variously controlling selection of the port number of the other party to be controlled to be electronic exchange system based on dial information, or based on an off-hook, an on-hook and the like. Further, the storage section 115 has a control program of functions for entering the extension number of the call-out side at the terminal having incoming call no answer for a predetermined time as a failure call corresponding to its portable station when the termination call of the portable station 170 is received, then calling out to call back the portable station at the stage that enables to communicate with the portable station and calling out the call-out extension number which has become the failure call when the portable station responds.

The cell station 150 is connected to the specific interface circuit, and can communicate with the portable station 170 by a radio communication. The cell station 150 functions as a cell station for cross linking information transmission between the interface circuit 116 and the respective portable stations 170. The cell station 150 controls a call originating connection, an incoming connection in response to a signal from the portable station 170, and delivers a speech signal. Further, the cell stations 150 are installed at different positions, have calling areas in predetermined regions and can communicate with the portable stations 170 existing in the calling areas. The cell stations 150 respectively have a plurality of communication channels, and simultaneously use radio communication channels corresponding to the number of channels to the portable stations. The portable stations 170 can selectively use the plurality of the communication channels, obtain the right of occupation by searching idle channel when necessity of communicating with the cell station 150 occurs, and communicates with the cell station 150 by using the obtained channel. Further, the cell station 150 searches idle channel of the plurality of communication channels to execute incoming connection or call originating connection to the specific portable station, allocates suitable idle channel, and gives the right of occupation as the communication channel to the portable station.

The above-described portable stations 170 each has a fundamental function as a telephone terminal, and a radio transmitter and a radio receiver for radio communicating. The portable station 170 also has a controller for variously controlling and a memory. The portable station 170 is set with an extension number for specifying the portable station, and generated with a command for periodically surveying its position by using a control channel from the electronic exchange system 110 to the respective portable stations 170 of non-talking state under the control of the controller 114. The respective cell stations 150 transmit the commands and wait for reply from the portable station. The electronic exchange system 110 grasps that the respective portable stations 170 are located at any calling areas according to answers obtained from the cell station 150. Therefore, the respective portable stations 170 have functions for returning own ID information by using the control channel (or idle channel) when receiving the command for surveying the position.

The electronic exchange system having the above-described structure variously processes to electronic exchange system as will be described.

When there is incoming from the centerized office line, the controller 114 detects the incoming from the trunk circuits 112, 113, and incomes at preset extension terminal (in the case of a trunk board system or an extension group system) as representative or directly at corresponding extension (in the case of PBX dial-in: a system for directly incoming by dialing its originator's number by receiving the originator's number from the central telephone electronic exchange system and allocating it to the extension). Then, the channel is obtained by the answer of the incoming extension terminal, and a communication between the both can be executed.

When this incoming is transferred to another extension, the incoming can be transferred from the incoming terminal. In this case, the controller 114 of the electronic exchange system 110 checks a specification for the extension to be transferred and calls, if the extension can be connected, the extension. When the terminal of the other party responds, the controller 114 obtains the channel between the extension to be transferred and the call-out side centerized office line by disconnecting the extension terminal transferred, thereby talking between the both.

The call-out from the extension to the centerized office line can be executed by the call-out of the extension terminal. In this case, the controller 114 searches the circuit of idle state in the trunk circuits 112, 113, checks the connection specification to the call-out extension, then obtains the channel by using the idle trunk circuit if the extension can be connected, and outputs dial information to the electronic exchange system. The extension terminal can communicate with the other party through the electronic exchange system.

In the case of the communication between the extensions, the electronic exchange system 110 receives the extension number of a request other party from the call-out extension, checks the connection specification between the extensions, and controls to income, if the extension can be connected, the line circuit corresponding to the extension number of the request other party. The electronic exchange system 110 obtains the channel when the terminal connected to the line circuit controlled to income responds, and can communicate with the other party. Various controls including call originating and incoming controls for the trunk circuits, the line circuit, the interface circuit for connecting the cell station are executed by using port numbers. For example, when a certain extension number 10 is allocated to the port number PO 10, in the case of calling the extension number 10, the port number PO 10 is accessed. The controller 114 executes such controls based on the terminal—the port number information stored in the storage section 115. In the case of the termination call at the portable station 170, the case of incoming at the portable station 170-1 existing in the calling area of the cell station 150-1 will be explained as an example. The controller 114 detects the calling area where the portable station 170-1 corresponding to the extension number of the incoming other party is disposed, and controls the incoming through the interface circuit 116-1 connected with the cell station 150-1 in which the detected calling area is used as an object to be served. Thus, the identification information of the incoming other party is sent together with the calling signal through the control channel from the cell station 150-1.

The respective portable stations 170 existed in the calling area receive the call signal and the identification information identifying the portable stations, the information such as extension number of the incoming other party. The respective portable stations 170 collate whether the call signal coincides with the identification (extension) number set to the own or not. If the call signal coincides with the extension number, incoming calling sound is generated, and reception information indicating reception of the incoming call together with the calling sound is radio transmitted. This reception information is received by the cell station 150-1, and sent to the controller 114 through the interface circuit 116-1. The controller 114 receives the reception signal through the interface circuit 116-1 and recognizes that the calling signal is received by the portable station 170-1 of the incoming other party, sends a tone signal indicating the calling to the call-out side, and informs the calling to the call-out side. When the portable station 170-1 operates off-hook button of an operation unit of the portable station 170-1 by its user, the portable station 170-1 radio transmits an answer signal. The answer signal is received by the cell station 150-1, and transmitted to the controller 114 through the interface circuit 116-1. The controller 114 knows that the terminal responds according to the information, controls the channel switch 111, obtains the channel to the call-out side and can communicate with the call-out side.

The electronic exchange system 110 registers the extension number of the call-out side as failure call for the portable station 170-1 with a predetermined storage area of the storage section 115 when incoming call no answer is received for a predetermined time from the portable station 170-1 corresponding to the extension number of the incoming other party. Then, the electronic exchange system 110 calls back the portable station 170-1 by calling at the stage to be able to communicate with the portable station 170-1. More specifically, the controller 114 controls to call back through the interface circuit 116-1 connected with the cell station 150-1 for serving the calling area disposed at the portable station 170-1 at the stage to be able to communicate with the portable station 170-1. Thus, the identification information of the incoming other party is transmitted together with the calling signal through the control channel from the cell station 150 to the portable station 170-1.

The respective portable stations 170 disposed in the calling area of the cell station 150-1 receive the calling signal and the identification information of the incoming other party, collate whether the calling signal coincides with the extension number set to the own or not, generates the calling sound of incoming if the calling signal coincides with the extension number, and radio transmits reception signal indicating that the incoming call is received. More specifically, the portable station 180-1 receives the calling signal and the identification information of the incoming other party, and sends the reception information. The sent reception information is received by the cell station 150, and sent to the controller 114 through the interface circuit 116-1.

The controller 114 recognizes by the reception of the reception information that the calling signal is sent to the portable station 170-1. The incoming is informed to the user by the calling sound at the portable station 170-1. When the user operates the off-hook button of the operation unit of the portable station 170, the portable station 170 radio transmits the answer signal. This answer signal is received by the cell station 150-1, and sent to the controller 114 through the interface circuit 116-1. The controller 114 recognizes by the answer signal that the terminal responds, and calls out the call-out side of failure call. In this case, the calling sound is sent through the line circuit connected with the extension terminal of the call-out side of the failure call. Simultaneously, the controller 114 sends a tone signal indicating calling through the cell station 150-1, and informs the calling to the portable station 170-1. When the extension terminal is the portable station 170 except the portable station 170-1, the above-described process is executed through the cell station 150 and the interface circuit 116 corresponding to the calling area disposed at the portable station 170 of the call-out side. Incoming is informed to the user of the extension terminal according to the calling sound at the extension terminal. The extension terminal is operated by off-hook by the user, and the answer signal is sent to the controller 114 from the line circuit of the extension terminal. The controller 114 recognizes by the answer signal that the terminal responds. Then, the controller 114 controls the channel switch 111 and obtains the channel with the cell station 150-1. Further, the cell station 150-1 obtains an idle channel, and can talk with the portable station 170-1. Since the cell station 150-1 can communicate with the portable station 170-1, the controller 114 deletes the failure call registered with the storage section 115. When a plurality of failure calls exist in the same portable stations, i.e., other failure call is registered as well with the portable station 170-1, the above-described process is repeated at the stage that the present talking is terminated, automatically called back, and automatically obtains the talking with the other party of the failure call. When the other party terminal of the failure call is busy or incoming call no answer is obtained even if a predetermined time is elapsed, the call is once disconnect, then again automatically called back after a predetermined time is elapsed or automatically called back to a terminal of another failure call.

As described above, when the failure call occurs at the portable station, the failure call is registered, and when the portable radio becomes possible to communicate, the call-out side terminal becoming the failure call is automatically called back. Thus, the speech between the portable station and the call-out side terminal becoming the failure call is obtained. In this manner, when the portable station becoming the failure call becomes possible to communicate, the communication possible to the portable station can be informed to the portable station and the call-out side terminal of the call becoming the failure call. Further, since the recalling state is automatically obtained to immediately communicate, service for the user can be improved.

The automatic calling-back function will be described in more details with reference to the drawings. A conception block diagram of the electronic exchange system 100 according to the first embodiment of the present invention is illustrated in FIG. 2.

Figure 2:
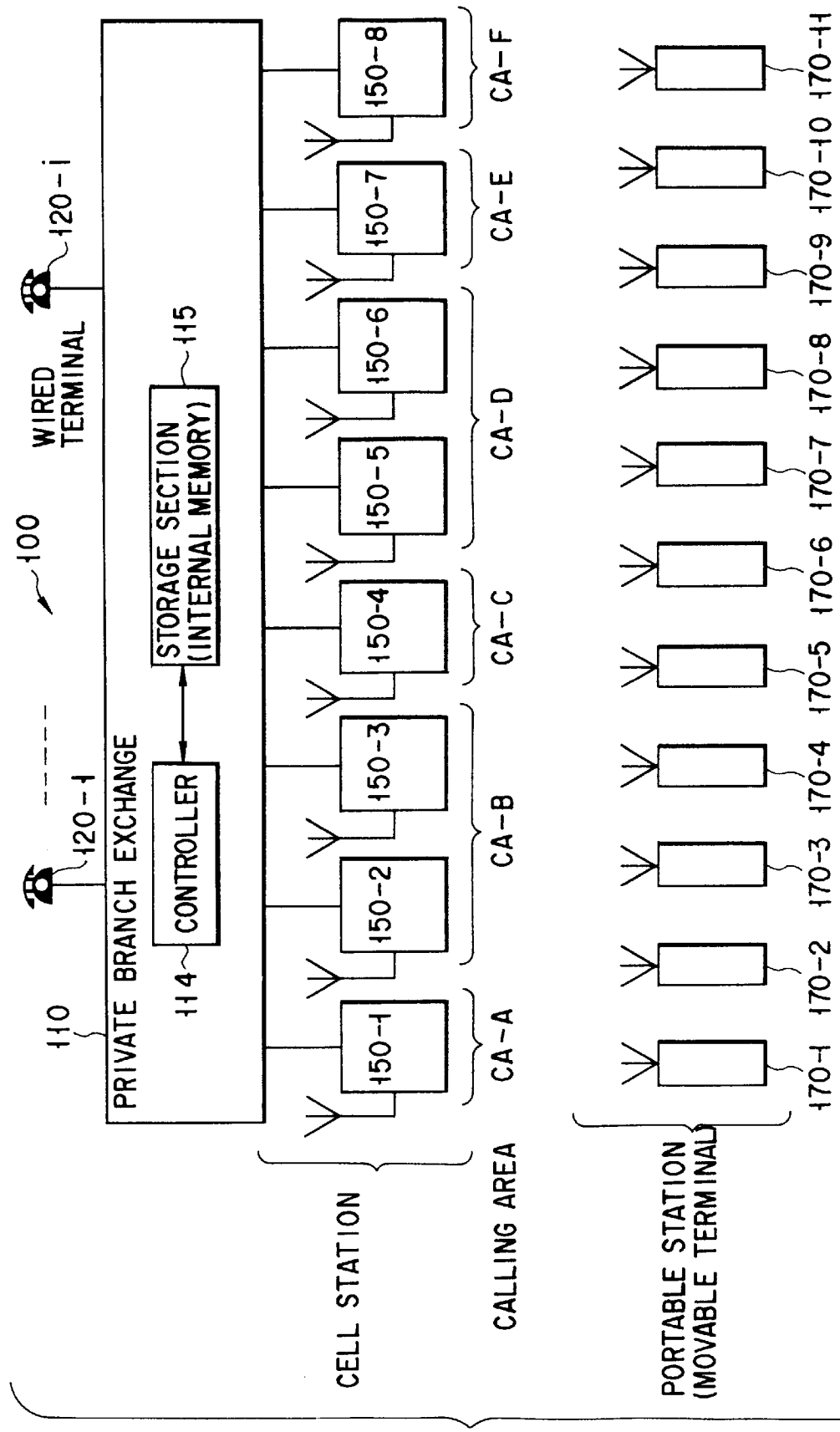
FIG. 2 is a block diagram of a principal portion of the electronic exchange system of FIG. 1.

As illustrated in FIG. 2, in the electronic exchange system 100 of the present invention, a plurality of wired telecommunication terminals (wired extension terminals) 120 (120-1 to 120-i) and a plurality of cell stations 150 (150-1 to 150-m, where m=8 in FIG. 2) of cell stations are connected to a private branch electronic exchange system 110, and a plurality of calling areas CA-A to CA-F are allocated to the plurality of portable station mater units 150 (150-1 to 150-8). Further, portable stations 170 (170-1 to 170-n, where n=11 in FIG. 2) are provided as portable stations in the electronic exchange system 100.

The cell stations 150 are respectively installed at separate different places, and respectively provided at predetermined regions at centers of the cell stations 150 with calling areas which can radio communicate. In this case, the calling area CA-B is so set as to serve two cell stations 150-2 and 150-3. Thus, there is also the case where one cell station serves one specific calling area or the case where a plurality of cell stations commonly serve one specific calling area. The plurality of cell stations 150-1 to 150-8 are respectively installed at different positions, and thus a plurality of calling areas CA-A to CA-F are obtained as calling areas. The portable station 170 is connected to the private branch electronic exchange is system 110 through such cell station 150, and can communicate between the wired telecommunication terminal 120 and other portable station 170.

The electronic exchange system 100 comprises the private branch electronic exchange system 110, the controller 114 and the storage section 115. The storage section 115 stores presence or absence of generation of incoming call (failure call) to the portable station not satisfied since a radio communication between the private branch electronic exchange system and the portable station is not established and information regarding a calling originator of failure call.

Figures 3, 4:
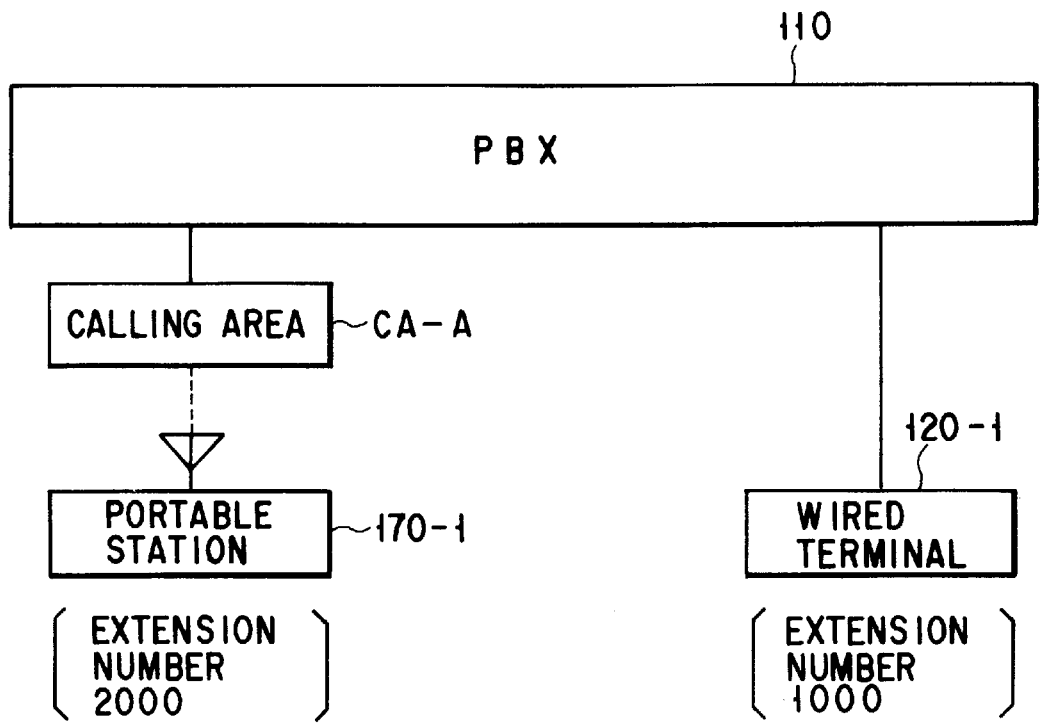
FIG. 3 is a block diagram showing connection between a portable station and a wired telecommunication terminal, to illustrate the operation of the electronic exchange system of FIG. 1.
FIG. 4 is a schematic illustration of a data table for a no response situation that can be used for the electronic exchange system of FIG. 1.

Then, an operation of the electronic exchange system 100 illustrated in FIG. 2 will be described. The operation of the electronic exchange system 100 will be described with reference to FIG. 3. In FIG. 3, the private branch electronic exchange system 110 is connected with a plurality of cell stations 150 (150-1 to 150-8) which can communicate in the calling areas CA-A to CA-F at different positions. If the portable station 170-1 having an extension number "2000" exists, for example, in the calling area CA-A of the calling areas CA-A to CA-F, various services are provided for the portable station 170-1 through the cell station 150-1. As illustrated in FIG. 3, the wires terminal 120-1 allocated with the extension number "1000" is connected to the private branch electronic exchange system 110 to provide a speech service. Note that, numbers designated to the wired telecommunication terminals and the portable stations are not limited to the extension numbers, and may be applied identification number (information) identifying these terminals. As described above, the respective portable stations 170 are previously set with the extension numbers, which are stored in the storage sections provided in the respective portable stations 170. At the time of controlling the call-out or the call, the portable station 170 receives the extension number through the private branch electronic exchange system 110 and the cell station 150, collates the extension number with the extension number stored in the storage section, and obtains a communication channel with the private branch electronic exchange system 110 in the case of coincidence.

An example of call failure information table to be stored in the storage section 115 in the private branch electronic exchange system 110 is illustrated in FIG. 4. Presence or absence of failure call and, in the case of the failure call, originating numbers of originating terminals are stored at the extension numbers in the call failure information table of the storage section 115 in the private branch electronic exchange system 110.

Figure 5:
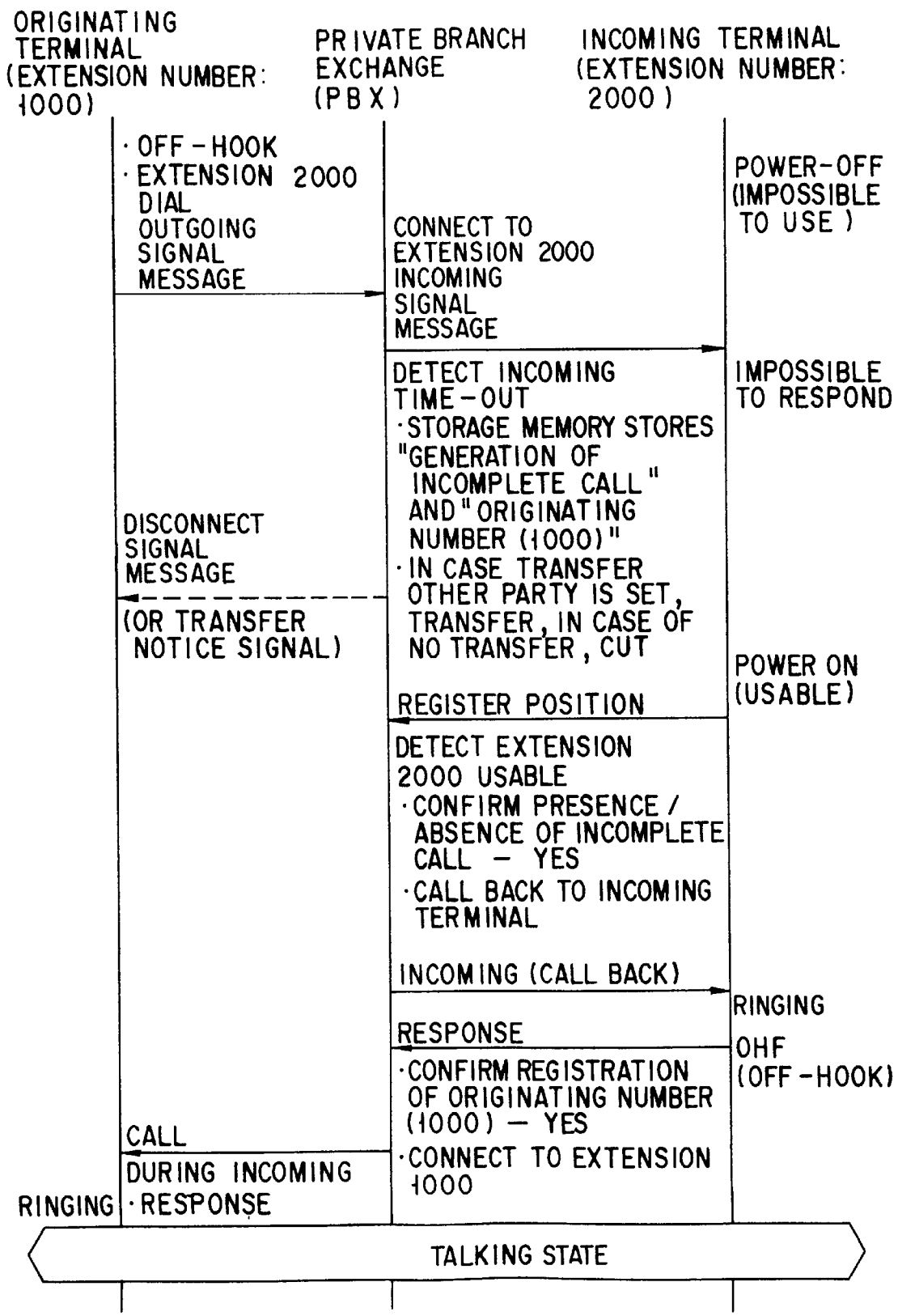
FIG. 5 is a chart showing a communication sequence for a no response situation and a call back operation that can be used for the electronic exchange system of FIG. 1.

An example of a communication sequence of the case where the portable station 170-1 is called by the wired telecommunication terminal 120-1 of an extension telephone is illustrated in FIG. 5. This communication sequence will be explained with reference to FIG. 5. In this case, the portable station 170-1 (extension number: "2000") of the incoming terminal is assumed to be impossible to be used due to power-off state.

The wired telecommunication terminal 120-1 (extension number: "1000") of the originating terminal is first off-hooked, and the extension number "2000" of the incoming terminal is dialed. The private branch electronic exchange system 110 receives an outgoing signal message from the originating terminal, and sends an incoming signal message through all the cell stations 150 for constituting the calling area illustrated in FIG. 3.

However, since the incoming terminal is in an answer impossible state, the private branch electronic exchange system 110 does not respond to the call signal. On the other hand, the private branch electronic exchange system 110 sends the call signal, then waits for the answer from the incoming terminal, and executes a predetermined process by incoming time-out when incoming call no answer is obtained even if a predetermined time is elapsed. Therefore, since the incoming terminal is in the answer impossible state, the private branch electronic exchange system 110 sends the call signal, and then becomes incoming time-out after the predetermined time is elapsed.

The private branch electronic exchange system 110 stores the extension number "1000" of the wired telecommunication terminal 120-1 of the originating terminal for the call and generation of failure call in the storage section 115. Further, the private branch electronic exchange system 110 judges presence or absence of registration at a transfer other party at the time of incoming time-out with respect to the incoming terminal, transfers to the transfer other party registered if registered, or disconnects to the originating terminal if not registered.

Then, it is assumed that the portable station 170-1 of the incoming terminal is turned power-on. After the power-on, the portable station 170-1 processes to register own presence (location) with the private branch electronic exchange system 110. Thus, a radio communication between the private branch electronic exchange system 110 and the incoming terminal is established. The private branch electronic exchange system 110 detects information of the failure call of the portable station 170-1 from the call failure information table of the storage section 115 in response to the location registration. The failure call from the wires 120-1 previously becoming failure is registered with the call failure information table. Thus, the private branch electronic exchange system 110 calls the portable station 170-1, reads the originating number of the failure call (in the case of this example, the extension number "1000" of the wired telecommunication terminal 120-1) from the call failure information table of the storage section 115 when the portable station 170-1 responds, and calls out the wired telecommunication terminal 120-1. When the wired telecommunication terminal 120-1 (the extension number "1000") responds, a channel is obtained to be able to communicate the portable station 170-1 of the extension number "2000" with the wired telecommunication terminal 120-1 of the extension number "1000". As processed above, useful service is provided for the portable station 170 and the wired telecommunication terminal 120 becoming call failure due to the speech impossible state.

Then, an operation in the private branch electronic exchange system 110 will be explained with reference to FIGS. 6 and 7. A process flow of the private branch electronic exchange system 110 when the portable station 170-1 incomes is illustrated in FIG. 6, and a process flow of the private branch electronic exchange system 110 when the portable station 170-1 of the speech impossible state becomes possible to talk is illustrated in FIG. 7.

Figure 6:
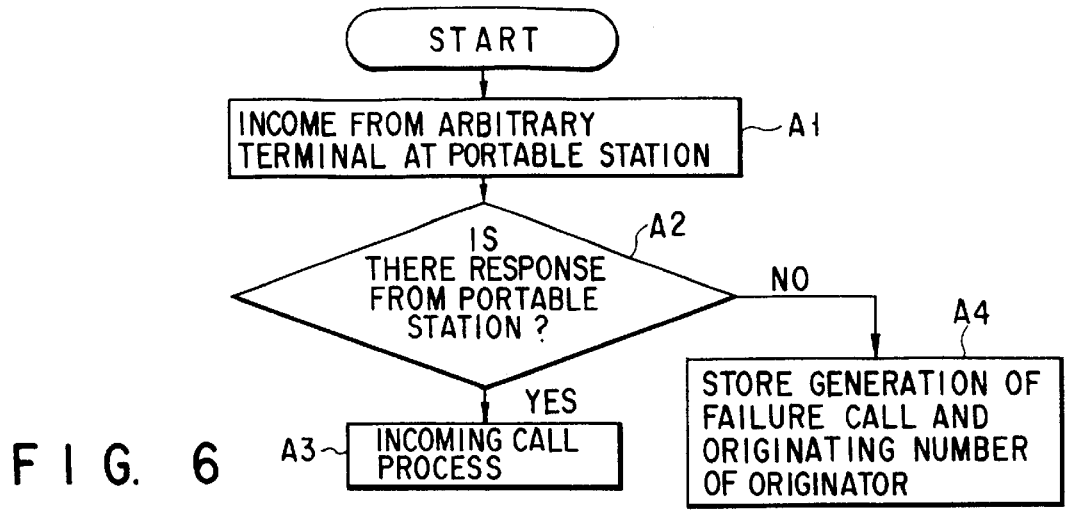
FIG. 6 is a flow chart showing the operation of the electronic exchange system of the electronic exchange system of FIG. 1 when there is an incoming call sent to one of the portable stations.
Figure 7:
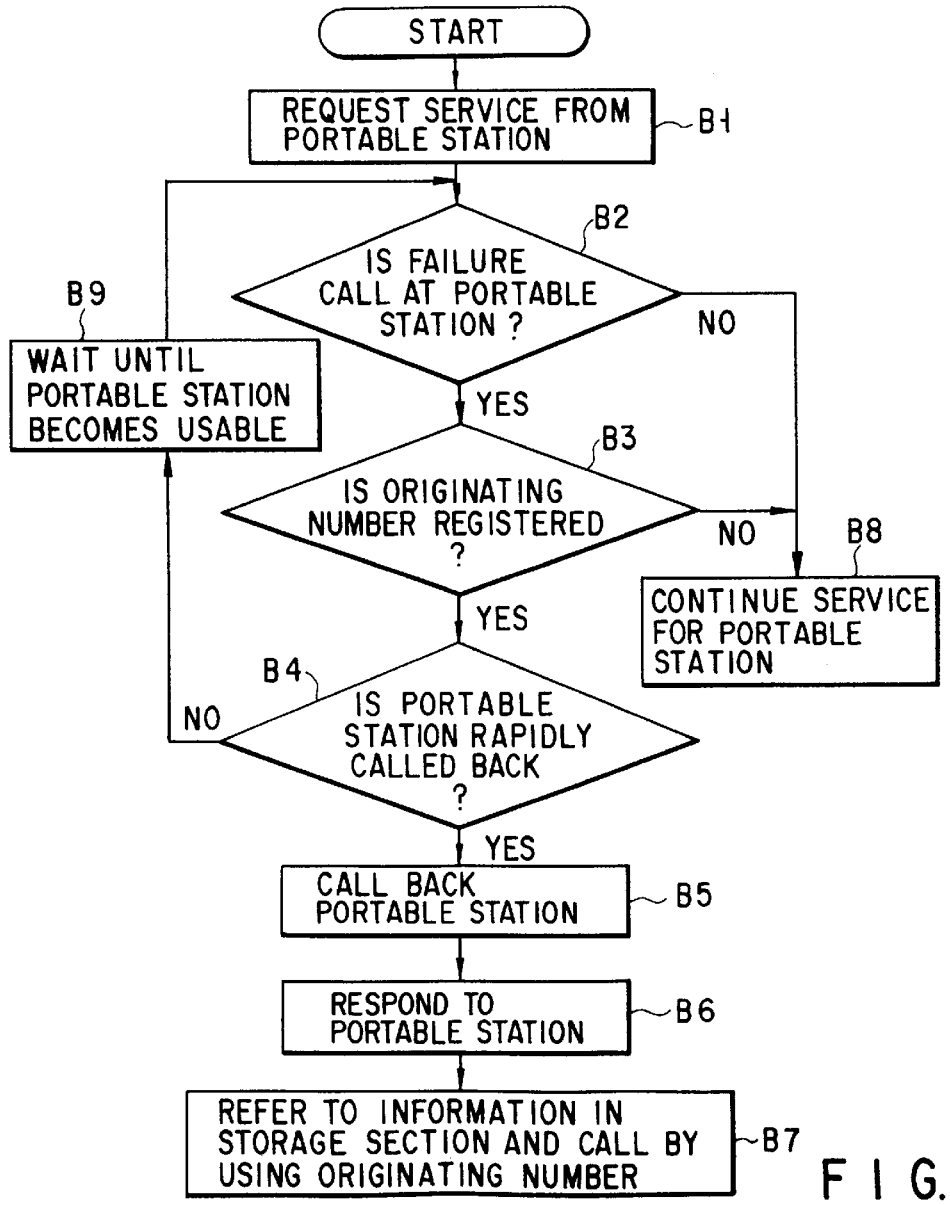
FIG. 7 is a flow chart showing the operation of the electronic exchange system of FIG. 1 when there is a service request from one of the portable stations.

As illustrated in FIG. 6, when the portable station 170-1 incomes (step A1), the private branch electronic exchange system 110 controls the incoming of the portable station 170-1 and calls to examine whether there is an answer or not (step A2). When there is the answer from the portable station 170-1, the private branch electronic exchange system 110 processes a call (step A3), and the portable station 170-1 is set to be able to talk with the call-out terminal. If there is incoming call no answer from the portable station 170-1 up to the lapse of a predetermined time at the step A2, the private branch electronic exchange system 110 generates a failure call at the call failure information table in the storage section 115 of the private branch electronic exchange system 110 as the failure call and sets information of the originating number of the calling originator to the table position corresponding to the portable station 170-1 (step A4).

As described above, each time when the failure call for the portable station as the movable terminal is generated, the private branch electronic exchange system 110 generates the failure call at the call failure information table and sets the information of the originating number of the calling originator at the table position corresponding to the portable station in which the termination call is failed.

Then, an operation of the private branch electronic exchange system 110 at the stage that can communicate with the portable station 170-1 of the movable terminal will be explained with reference to a flow chart of FIG. 7. When the private branch electronic exchange system 110 receives a location registration or a service request of originating from the portable station 170-1 (step B1), presence or absence of the failure call regarding the portable station 170-1 of the service request origin is determined from the information regarding the failure of the termination call held by the storage section 115 of the private branch electronic exchange system 110, i.e., the call failure information table as illustrated in FIG. 4 (step B2). When there is the failure call, presence or absence of the originating number is further determined (step B3). When the originating number is stored, whether the portable station 170-1 can be immediately called back or not is determined (step B4). If the call-back can be immediately executed by this determination, the portable station 170-1 is called back (step B5).

When there is the answer from the portable station 170-1 (step B6), the private branch electronic exchange system then refers to the call failure information table of the storage section 115, knows the originating number of the failure call for the portable station 170-1, and calls by using the originating number (step B7). If the other party responds, a channel to the portable station 170-1 is obtained to be able to talk, and the private branch electronic exchange system 110 deletes the information of the originating number of the failure call regarding the portable station 170-1 in the call failure information table.

As a result of the determination at the step B2, when there is no failure call, a service for the portable station 170-1 is continued (step B8). As a result of checking presence or absence of originating number registration at the step B3, when there is no originating number registration, a service for the portable station 170-1 is continued at the step B8. As a result of the check at the step B4, if the portable station is not immediately called, it is waited until the portable station 170-1 becomes usable (step B9), and the flow after the step B2 is again executed.

As described above, the electronic exchange system 100 according to the first embodiment of the present invention stores the information regarding the calling originator of the call together with the fact of the failure in the storage section 115 when the call is failed due to no establishment of the radio communication with the portable station 170 in the case of incoming at the portable station 170. Then, when the establishment of the radio communication with the portable station 170 is detected, if the presence of the termination call of failure so far is stored, the calling originator of the failure is called back by using the information regarding the calling originator of the call stored in the storage section 115.

Therefore, even if the call connection is not executed due to the no establishment of the radio communication between the portable station 170 and the electronic exchange system 110 for the originating to the portable station 170, if the radio communication between the portable station 170 and the electronic exchange system 110 is thereafter established, the call connection between the extension of the originating origin to become the failure call and the portable station 170 becoming possible to communicate is automatically executed. Thus, inconvenience of no connection to the portable station of a purpose to any time even if there is business is eliminated, and its service can be improved.

The above-mentioned description is the example in which, when the failure call for the portable station is generated, the originating origin of the failure call is automatically called back to be connected at the time of becoming possible to communicate at the portable station, thereby enabling to talk. The calling connection of the portable station 170 and the calling originator of the failure call may be executed at the originating from the portable station 170 as an opportunity even after the location registration request from the portable station 170. However, when the automatic calling back is executed with the originating from the portable station 170 is used as the opportunity, the portable station 170 immediately originates the arbitrary terminal after the radio communication is established, and hence the call-back process is not immediately executed. Therefore, application of the present invention is executed after the call of the portable station 170 is completed and then the terminal state becomes idle.

Further, in the first embodiment described above, the call-back process is automatically executed. However, the present invention is not limited to the particular embodiment. For example, a service with dialing of specific numbers or pressing of functional key from the portable station 170 as opportunities can be provided. When the automatic call-back with the dialing of the specific numbers or pressing of the functional key as the opportunities is executed, the user himself consciously recognizes presence or absence of failure call to execute automatic call-back service, and hence the user side has prepared, and a situation in which the user is unintentionally connected to the other party to flurry can be avoided.

According to the first embodiment having the above-described calling-back function, the case where a plurality of different extension terminals income at the time of impossible to communicate with the arbitrary portable station 170 is considered. In this case, the electronic exchange system 110 may call back by applying priority order to the extension terminal registered to the call failure table. For example, the calling-back processes are sequentially called back from older income, or the extension terminal is previously grouped according to priority, and the terminals may be sequentially called back in the order of the extension terminals belonging to the group having high priority.

However, in case where incomes from many different extension terminals at the time of disabling to communicate when call-backs are sequentially processed as described above, the user of the portable station has a fear of taking much time for the call-backs. Therefore, number of the extension terminals to be called back, i.e., number of the extension terminals registered with the call failure table may be previously limited at each portable station 170 in the electronic exchange system 110. In this case, if the registrations with the call failure table exceeds the upper limit of the predetermined number of the registrations for the arbitrary portable station 170, there is considered a method for always registering only the extension terminal regarding the latest call failure. In this case, the call failure table for the arbitrary portable station 170 is functioned as a queue. For example, if the call failures exceeding the upper limit of the number of registrations occur, oldest registration in timing of the extension terminal already registered with the call failure table is deleted, and instead the extension terminal regarding the latest call failure is registered.

When the call failure table is functioned as the queue at each portable station 170 as described above, number of times becoming the call failure at each extension number of the extension terminal of the originating origin is, for example, counted, and the portable station 170 to be an object may be connected sequentially of the extension terminal having more number of counts in the call-back process.

Then, another embodiment in which, when the portable station becomes impossible to communicate after the incoming call no answer for the portable station occurs, the automatic call-back for the call becoming the incoming call no answer is not executed, but presence of the call becoming incoming call no answer is informed as the information to the portable station will be described as a second embodiment.

Figure 8:
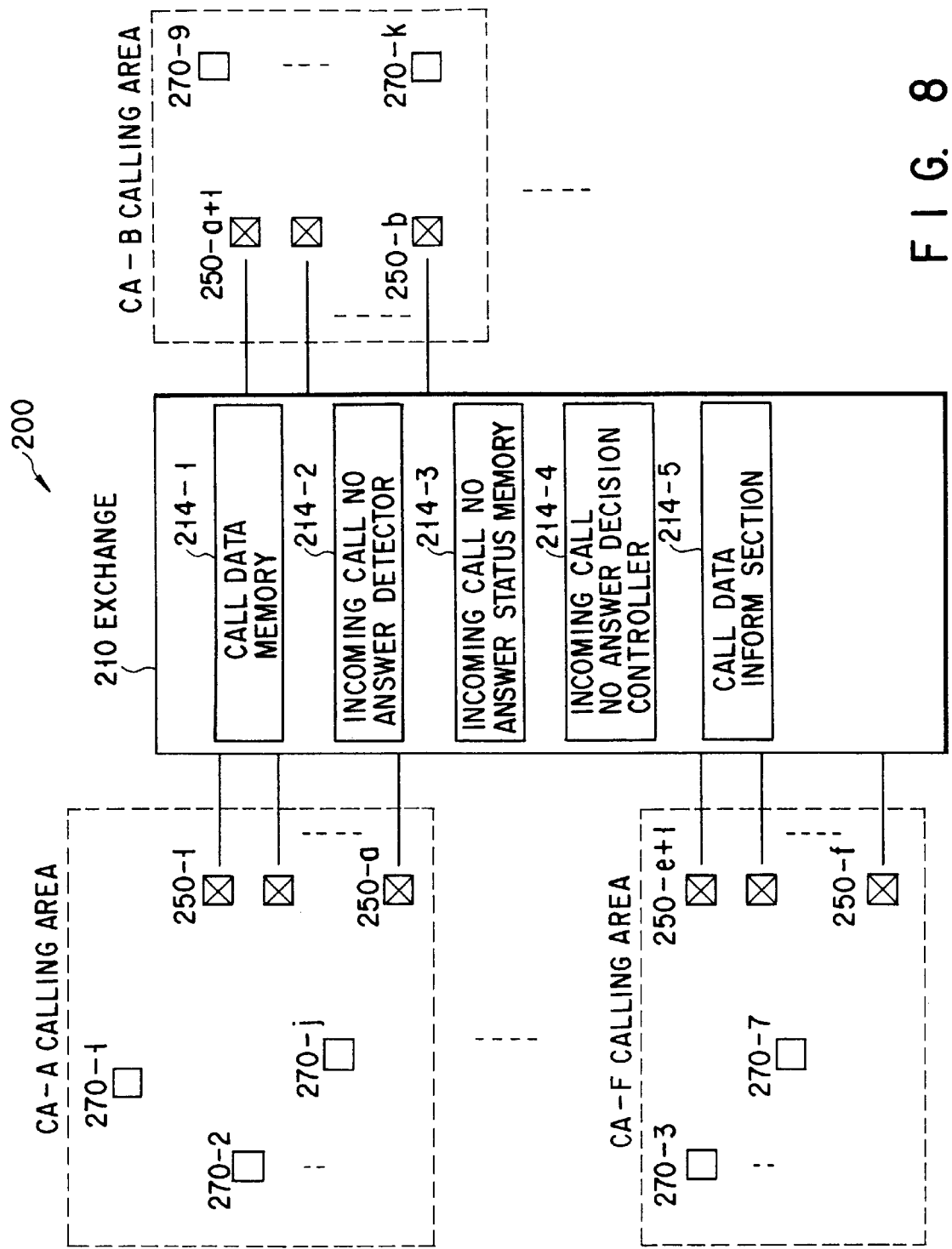
FIG. 8 is a block diagram showing the entire configuration of the second embodiment of electronic exchange system according to the invention.

This second embodiment will be explained with reference to FIGS. 8 to 13. An electronic exchange system 200 according to the second embodiment has the same fundamental structure as the electronic exchange system 100 illustrated in FIG. 1, and therefore the detailed description of the constituents will be omitted. A central structure of the electronic exchange system 200 according to the second embodiment will be explained with reference to FIG. 8. To a private branch electronic exchange device 210 in FIG. 8 is connected cell station 250 (250-1 to 250-f) serving as a plurality of portable station (cordless telephone) cell stations, and portable stations 270 (270-1 to 270-k) serving as cordless telephone mobile stations through the cell stations 250. The respective cell stations 250 are grouped to constitute calling areas CA-A to CA-F.

The portable station 270 has, in addition to a fundamental function as the cordless telephone terminal, a display function for character-displaying character information, e.g. character, figure and pictograph, to be fed from the private branch electronic exchange device 210 side by a radio communication, and can display the character on a display unit such as, for example, an LCD (Liquid Crystal Display) by the display function.

The controller 214 in the private branch electronic exchange device 210 has various functions to be explained later. First, a call data memory 214-1 stores information regarding call income when portable station 270 incomes. An incoming call no answer detector 214-2 detects no reception of an answer signal from the portable station 270 within a predetermined time after the electronic exchange device 210 sends an incoming signal message to the portable station 270 through the cell station 250. An incoming call no answer storage controller 214-3 stores occurrence of an incoming call no answer in response to the detection of the incoming call no answer by the incoming call no answer detector 214-2. An incoming call no answer determination controller 214-4 determines whether an incoming call no answer for the portable station occurs or not when a service is provided for the portable station 270. A call data inform section 214-5 informs call information to the portable station.

The relationship between a calling area and a cell station (radio communication master unit) 250 of the second embodiment is illustrated in FIG. 9. In this second embodiment, a calling area CA-A has cell stations 250-1 to 150-a, a calling area CA-B has cell stations 250-a+1 to 250-b, and the following is similarly formed, and a calling area CA-F is served by cell stations 250-e+1 to 250-f.

Figure 11:
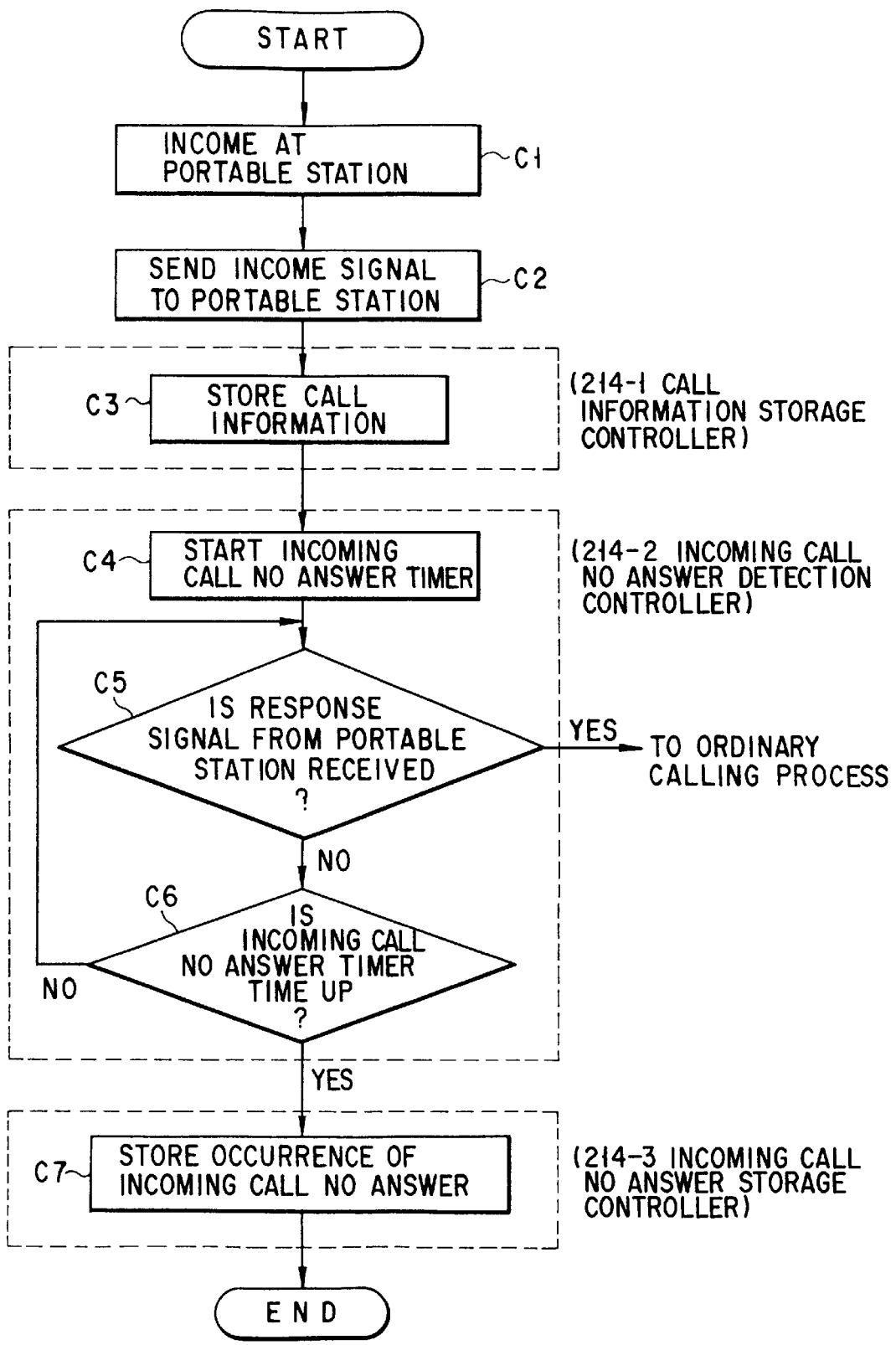
FIG. 11 is a flow chart showing a control operation of the electronic exchange system of FIG. 8 when there is an incoming call.

Then, an operation of the electronic exchange system 20 according to the second embodiment of the case where the electronic exchange device 210 incomes for arbitrary portable station 270 (portable station 270-1 in this case) will be explained with reference to FIGS. 10 and 11. In this case, the portable station 270-1 is position-registered with the calling area CA-A in the state that a power source is turned OFF (disconnect).

First, it is assumed that the user of the portable station 270-4 allocated with an extension number "4000" originates to the portable station 270-1 allocated with an extension number "2000". The controller 214 of the electronic exchange device 210 reads location information of the portable station 270-1 by the income to the portable station 270-1 by this originating operation (step C1 in FIG. 11), and controls to send an incoming signal message to the cell station 250-1 to 250-a of the cell station in the calling area CA-A (step C2), the controller 214 of the electronic exchange device 210 simultaneously stores income information (extension number of the call-out side) of the portable station 270-1 by the call data memory 214-1 (step C3), and the incoming call no answer detector 214-2 discloses a count of incoming call no answer time (step C4).

An example of the call information storage table for storing call information is illustrated in FIG. 10. The cell station 250-1 to 250-a of the cell stations receive incoming signal messages from the electronic exchange device 210 to the portable station 270-1, and thus sends the incoming signal message to the portable station 270-1. The incoming call no answer detector 214-2 checks whether an answer signal from the portable station 270-1 is received or not (step C5), and transfers to an ordinary call if the answer signal is received. However, since the power source is turned off in the portable station 270 as described above, the answer signal to the incoming signal message is not sent to the cell station.

The controller 214 checks whether the incoming call no answer timer is counted up or not at a step C6 when no reception of the answer signal is judged at the step C5 (NO), and returns to the step C5 if the timer is not counted up.

However, since the portable station 270 does not send the answer signal to the incoming signal message to the cell station because the power source is turned off, the controller 214 of the electronic exchange device 210 detects occurrence of incoming call no answer after a predetermined time is elapsed. More specifically, the time counted by the incoming call no answer detector 214-2 arrives at the preset time and hence occurrence of the incoming call no answer is detected (step C6).

In this case, the incoming call no answer status memory 214-3 of the controller 214 of the electronic exchange device 210 stores occurrence of the incoming call no answer at the call information storage table illustrated in FIG. 10 (step C7). In other words, a no answer flag of the corresponding position of the portable station 270-1 of this table is set to "yes".

Then, it is assumed that the portable station 270-1 is moved to the calling area CA-B and the power source is turned on (closed). The following operation of the electronic exchange device 210 will be explained with reference to FIGS. 12 and 13. The portable station 270-1 requests a location registration to the electronic exchange device 210 through, for example, the cell station 250-b becoming the nearest cell station in the calling area CA-B by the application of the power source.

As described above, the controller 214 of the electronic exchange device 210 rewrites location information of the portable station 270-1 with calling area CA-B belonging to the cell station 250-b of the cell station (steps D1 and D2 in FIG. 12). The controller 214 of the electronic exchange device 210 determines whether incoming call no answer time-out of the call at the portable station 270-1 occurs or not by the incoming call no answer decision controller 214-4 (step D3), and ends the process if the incoming call no answer does not occur. In this case, if the incoming call no answer occurs, location registration end is informed to the portable station 270-1, the call data inform section 214-5 of the controller 214 reads the call information stored in the table of FIG. 10 (step D4), and informs the call information to the portable station 270-1 through the cell station 250-b of the calling area CA-B (step D5).

The portable station 270-1 displays the informed call information on an LCD display unit of own display unit. A display example of this call information is illustrated in FIG. 13. The example illustrated in FIG. 13 displays a service content of "position registered", present date information of "3/3 16:00" (16 o'clock on March 3), occurring time information of "3/3 10:00" (10o'clock on March 3) "3/3 12:00" (12 o'clock on March 3) as information of generated failure call and originating origin extension numbers "4000" and "3000" of failure call as "<<income history>>".

The present invention is not limited to the particular second embodiment. For example, the table structure, the method for displaying the call information may be optionally determined in response to its specifications. The opportunity for informing the call information is not limited to the case of the location registration. For example, the opportunity may be an initial originating after the incoming call no answer occurs or during incoming process. If an income call is transferred when the incoming call no answer occurs, information regarding the transfer other party may be informed to the portable station.

A modified example of the second embodiment will be described with reference to FIGS. 14 to 20.

Figures 14, 15:
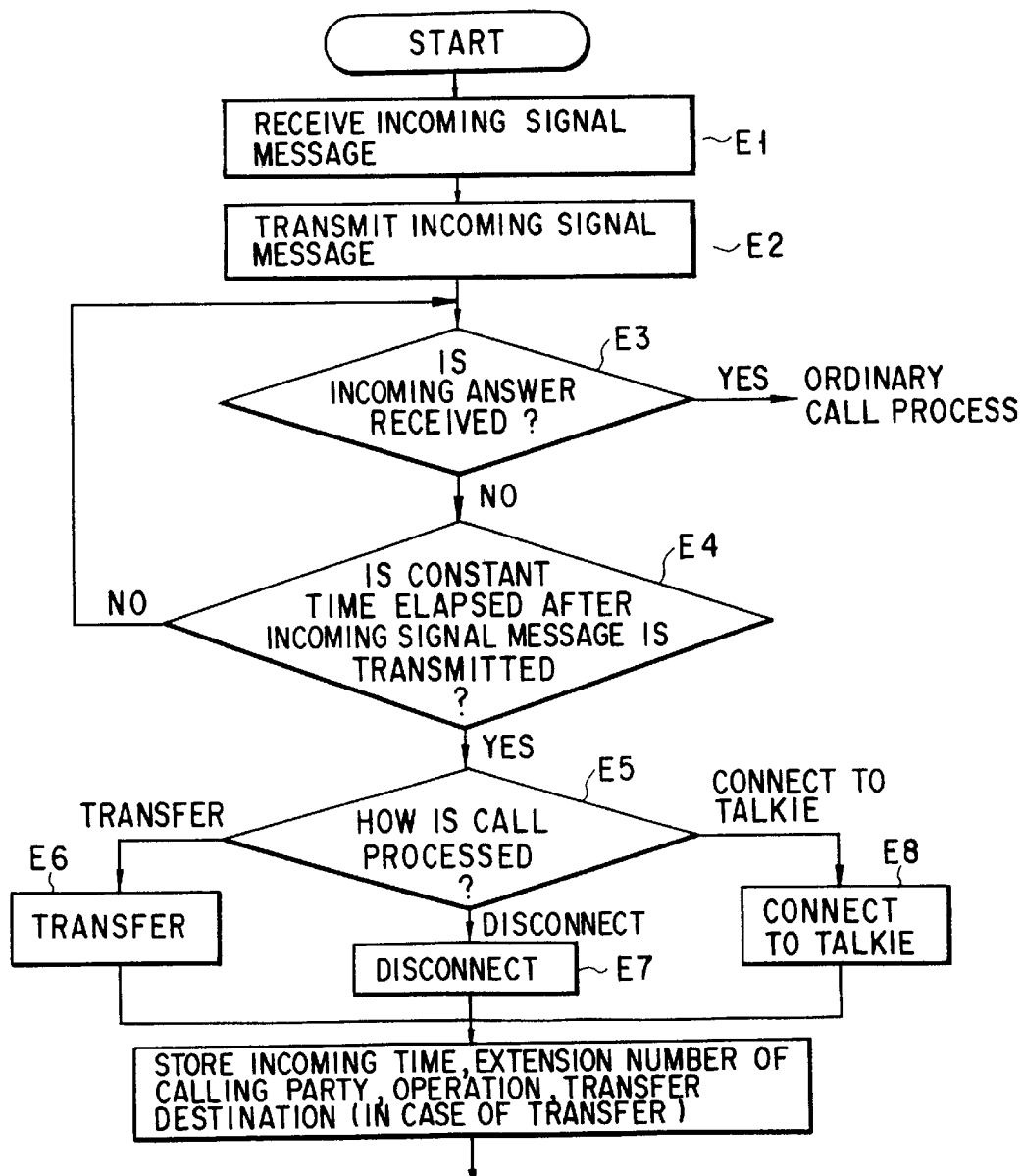
FIG. 14 is a schematic illustration of an incoming call data memory table on a portable station that can be used for the modified second embodiment of electronic exchange system of the invention.
FIG. 15 is a flow chart showing the operation of the electronic exchange system in response to a call signal from a portable station of the modified second embodiment of electronic exchange system of the invention.

An example of the income information storage table regarding arbitrary portable station 270 provided in the storage section 215 of the electronic exchange device 210 is illustrated in FIG. 14. In FIG. 14, it is illustrated that four incoming call no answers are generated at the time of disabling to communicate with the arbitrary portable station 270 such as, for example, portable station 270-1. As to the income failures, a time, a number allocated intrinsically to a calling originator, a process when the incoming call no answer occurs, and a transfer destination when the transfer process is executed are indicated in this case. When the incoming call no answer occurs, the case where a disconnecting process is conducted to the originating origin, the case of transferring to preset transfer destination, and the case connected to a talkie are presumed. The user of the portable station 270 receives call information based on such a table and determines what process to be executed for the incoming call no answer generated at the time of disabling to communicate.

Figures 16, 17:
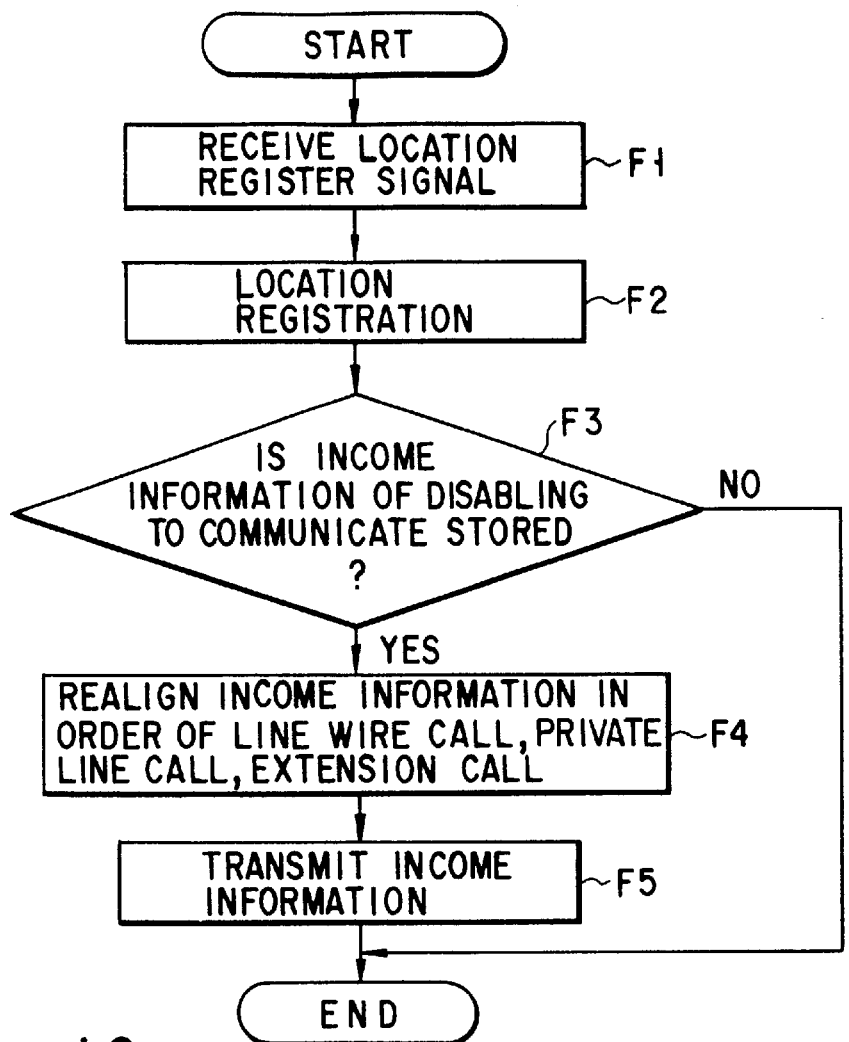
FIG. 16 is a flow chart showing the operation of the electronic exchange system in response to a location registration signal from a portable station of the modified second embodiment of electronic exchange system of the invention.
FIG. 17 is a calling party data table on the telephone number of the calling party that can be used for the modified second embodiment of electronic exchange system of the invention.
Figure 28:
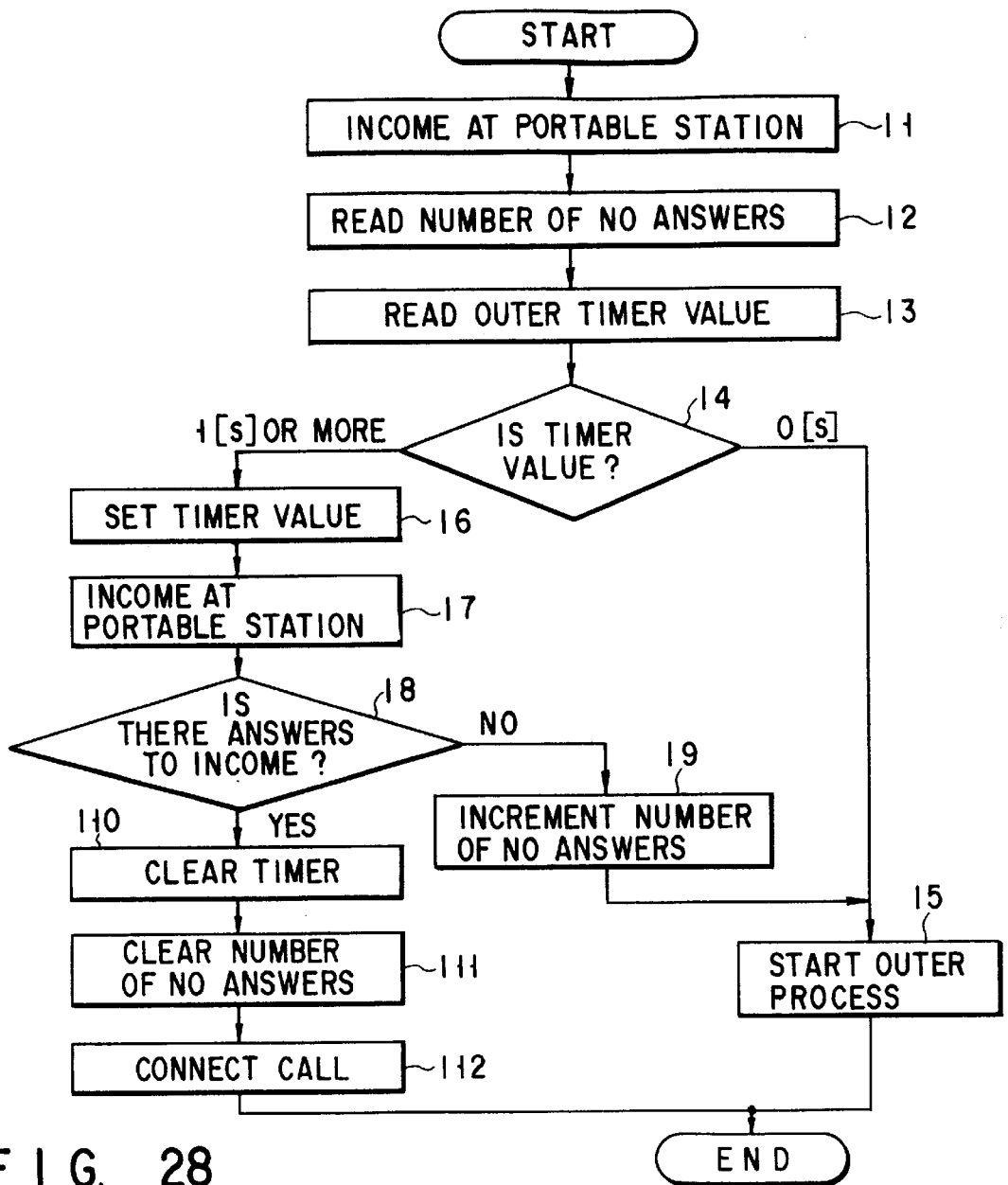
FIG. 28 is a flow chart showing the operation of the electronic exchange system in response to an incoming call to a portable station of the fourth embodiment.

Then, the case of incomes from a plurality of different originating origins at the time of disabling to communicate at the arbitrary portable station 270 will be described with reference to FIGS. 15 to 17. Flow charts illustrated in FIGS. 15 and 16 show a process after an incoming signal message for the arbitrary portable station 270 is received and a process after a location registration signal from the arbitrary portable station 270 is received. In the following description, an example in which a portable station 270-1 is used as the arbitrary portable station 270 is used. Further, the storage section 215 has the income information storage table for the respective portable stations 270, and a calling originator information table regarding calling extension number of calling parties as illustrated in FIG. 17. A service class shown in FIG. 17 is used to identifying calling parties according to necessity of early response. For example, an incoming call form an customer via outer line may be required to response as soon as possible.

First, when the electronic exchange device 210 receives the incoming signal message at the portable station 270-1, the electronic exchange device 210 sends the incoming signal messages to the cell station 250 in which the calling area disposed at the portable station 270-1 is to be served or the portable station 270-1 through all the cell stations 250 (steps E1 and E2). Thereafter, when the incoming answer is sent from the portable station 270-1 within a predetermined constant time (steps E3 and E4), the electronic exchange system 21 connects the terminal of the incoming signal message originating origin to the communication channel to enable to communicate. If incoming call no answer is obtained from the portable station 270-1 even if the constant time is elapsed in the case of NO at the step E3 and NO at the step E4, the electronic exchange device 210 judges that the portable station 270-1 is disabled to communicate.

Thereafter, the electronic exchange device 210 determines whether any of the transfer process, the disconnect process and the talkie connecting process is executed or not based on the calling extension number of calling party allocated to the originating origin who originates the incoming signal message to the portable station 270-1 (step E5). For example, when the transfer destination at the time of generating the incoming call no answer at the calling extension number of calling party or the extension number allocated to the portable station 270-1 is registered with the storage section 215, the electronic exchange device 210 executes the transfer process to the transfer destination (step E6). When the storage section 215 stores the information for instructing the connection of the channel of the originating origin to the talkie at the time of generating the incoming call no answer to the portable station 270-1, the electronic exchange device 210 processes the connection of the channel of the originating origin to the talkie (step E8). If any of the above-described information is not stored in the storage section 216, the electronic exchange device 210 processes to disconnect the communication with the originating origin (step E7).

The electronic exchange device 210 executes the above-described transfer process, the connecting process to the talkie or the disconnecting process, and then registers the transfer destination with the income information storage table if the information regarding the generation of the incoming call no answer, i.e., the incoming time, the calling extension number of calling party, the executed process and the transfer process when this process is the transfer process (step E9).

Thereafter, it is assumed that the portable station 270-1 becomes the state for enabling to communicate and the location registration signal is sent to the portable station 270-1. In this case, the electronic exchange device 210 receives the location registration signal through the cell station 250 in which the calling area disposed at the portable station 270-1 is to be served (step F1). The electronic exchange device 210 processes to register the position, retrieves the income information storage table stored in the storage section 215, and judges whether the information regarding the portable station 270-1 is registered or not (steps F2 and F3). For example, when the information illustrated in FIG. 14 is held in the income information storage table, the respective registrations illustrated in FIG. 14 are realigned according to the call types by using the calling originator information table illustrated in FIG. 17 (step F4). In this case, the registrations are realigned in the sequence of the centerized office lines, the private line calls and the extension calls according to the call types. The electronic exchange device 210 adds the calling originator list to the information realigned, and sends the realigned information as the call information to the portable station 270-1 (step F5). In this manner, the information as illustrated in FIG. 18 is illustrated on the display unit of the portable station 270-1. The display unit is so set as to display the three call information on one screen, and the other call information is displayed when the user of the portable station 270-1 selects next page. More specifically, the information which cannot be displayed on one screen can be confirmed by scrolling the screen. Such information is displayed, the user of the portable station 270-1 can recognize the income information (call information) at the time of disabling to communicate, and take the suitable process. As described above, the call of improving the serviceability of the electronic exchange system 200 can be provided.

It is noted that the portable station 270-1 may display the information based on the service class of the originator as illustrated in FIG. 18, display the information in the sequence of older numbers of incomes as illustrated in FIG. 19 or display the information in the sequence of more numbers of the incomes as illustrated in FIG. 20. Further, in this modified example, the various information is displayed in response to the user's request of the portable station 270-1. It is also noted that these various displays may be executed by so constructing the electronic exchange system 200 as to display in response to the output of the specific signal from the portable station 270 or the display example may be selected according to the information stored in the electronic exchange system 210 and the information may be sent to the portable station 270.

In the second embodiment of the present invention as described above, in the case of the incoming to the portable station 270 to be provided by the electronic exchange system 200 comprising the cell station 250, the portable station 270 and the electronic exchange device 210, the information regarding the call incoming when the portable station incomes is stored in the storage section 215 by the call data memory 214-1. When no reception of the answer signal from the portable station 270 is detected within the predetermined time after the incoming signal message is sent to the portable station 270 through the cell station 250 by the electronic exchange device 210, the incoming call no answer status memory 214-3 stores the information of the incoming destination and the originating origin in the table for storing the information regarding the incoming call corresponding to the portable station 270. The incoming call no answer determination controller 214-4 determines whether the incoming call no answer to the portable station 270 occurs or not based on the information stored in the storage section 215 when the service to the portable station 270 is provided. The call data inform section 214-5 informs the information regarding the call becoming the incoming call no answer to the portable station 270 when the incoming call no answer to the portable station 270 occurs. As described above, when the incoming call no answer to the portable station 270 occurs, the incoming call no answer is registered with the storage section 215, and then when any service to the portable station 270 is provided, the information regarding the call becoming the incoming call no answer is retrieved and informed to the portable station 270. Therefore, the call information at the time of disabling to communicate can be informed to the user of the portable station 270. For example, even when the user of the portable station 270 cannot income like the case of battery waste, power switch off, moving out of the calling area, if the state of enabling to communicate is thereafter obtained, the information of the call-out of the termination call of failure is displayed on the portable station 270, the call information at the time of disabling to communicate is informed to the user. Such a service can avoid the circumstances in which the calling originator of the extension has the business but the user of the portable station does not know forever, and the convenience is improved.

According to the second embodiment of the present invention as described above, the information of the call incoming when the answer signal from the portable station is not received within the predetermined time after the incoming signal message is sent to the portable station 270 is informed to the portable station when the service to the terminal is initially provided, thereby obtaining the electronic exchange system having the convenience of easily communicating with the person having the business.

The present invention is not limited to the above-described particular second embodiment. For example, the table structure, the method for displaying the call information may be arbitrarily determined in response to its specifications. Further, the opportunity of informing the call information is not limited to the time of location registration, but may be at the initial originating after the incoming call no answer occurs or during the income processing. Further, when the income call is transferred in the case where the incoming call no answer occurs, the information regarding the transfer destination may be informed to the portable station.

The first and second embodiments described above are so constructed as to inform the income call to the portable station later if the income call to the portable station is failed (incoming call no answer). However, the present invention is not limited to the particular embodiments. For example, there is the case where the person can talk with the user himself by non-resident transfer (substitute income) to the wired telecommunication terminal near the position where the user himself of the portable station lives at present if the income call to the portable station is failed.

For example, in the case of the portable station, number of the terminals is generally more than the speech channels on the radio communication channel, and the service is not always provided by the traffic. Therefore, when the portable station user executes the work at his own seat, if there is the wired telephone near at hand, the serviceability is improved when the wired telecommunication terminal near the user himself incomes.

Therefore, as a third embodiment of the present invention, an electronic exchange system having a substitute automatic incoming function for exchanging an incoming destination by automatically detecting presence of a portable station, informing its result to an electronic exchange system, thereby automatically determining whether the incoming is executed at the portable station or a wired telephone to switch the incoming destination and hence to easily communicate the incoming to the user of the portable station to the user himself, thereby improving operability and speech service will be described.

The third embodiment of the present invention will be explained with reference to FIGS. 21 to 25. The fundamental structure of an electronic exchange system 300 according to the third embodiment of the present invention is similar to that illustrated in FIG. 1, the detailed description of the structure will be omitted. A main portion of the third embodiment of the present invention will be described with reference to FIGS. 21 and 22. A schematic view of the structure of the private branch electronic exchange system 300 according to the third embodiment of the present invention is illustrated in FIG. 21, a schematic structure of a portable station position detector 380 for detecting presence or absence of a wired telephone 320, a portable station 370 and a portable station and informing the result to the electronic exchange system is illustrated in FIG. 22, a processing flow in the portable station position detector 380 is illustrated in FIG. 23, an example of a substitute incoming set table in the electronic exchange system 310 for storing presence or absence of the portable station 370 and a substitute incoming destination is illustrated in FIG. 24, and a substitute incoming processing flow in the electronic exchange system 310 is illustrated in FIG. 25.

As illustrated in FIG. 21, the wired telecommunication terminals 320 (320-1 to 320-i) and cell stations 350 (350-1 to 350-m) are connected to the electronic exchange system 310, and portable stations 370 (370-1 to 370-n) can be connected to the electronic exchange system 310 through the cell stations 350 which serve in a calling area where a user himself is disposed at present. Portable station position detectors 380 (380-1 to 380-i) for detecting presence or absence of the portable station and informing the result to the electronic exchange system 310 are so connected to the wired telecommunication terminals 320 (320-1 to 320-i) of extension wired telephone terminals as to correspond by one by one. Placing sections 381 (381-1 to 381-i) for placing the portable stations are respectively provided in the portable station position detectors 380. The portable station position detector 380 has a function for informing transition of the portable station 370 to a mode of substitute incoming to the electronic exchange system 310 when the portable station 370 is placed on the placing section 381, and a function for sending a portable station substitute incoming cancel informing to the exchange system 310 when the placed portable station 380 is removed from the placing section 381 of the portable station position detector 380.

The portable station position detector 380 is an apparatus for automatically judging presence or absence of the portable station 380 by an operation for placing or removing the portable station on or from a charger or the like for the portable station to be necessary as a pair with the portable station 370. When the portable station 370 is assembled with the charger for the portable station, the placing section 381 is constructed as a detecting switch provided in the charger.

As illustrated as an example in FIG. 22, the wired telephone terminal 320 connected with the portable station position detector 380 is previously corresponded to the specific portable station in the portable station 370. In FIG. 22, the wired telecommunication terminal 320-1 connected with the portable station position detector 380-1 is previously corresponded to the portable station 370-1. The storage section 315 of the electronic exchange system 310 has a substitute incoming set table which can register extension numbers of the specific portable station 370 and the wired telephone terminal 320 corresponding to the specific portable station 370 and information indicating presence or absence of the portable station position detector 380 of the portable station 370 on the placing section 381.

As described above, the wired telephone terminal 320-1 connected with the portable station position detector 380-1 is a wired telephone terminal placed near a user of the specific portable station 370-1, and its extension number and the extension number of the portable station are previously registered with the substitute incoming set table. Therefore, when the portable station 370-1 is placed on the placing section 381-1 of the portable station position detector 380-1, incoming at the portable station previously registered with the substitute incoming set table is substituted for the incoming destination at the wired telephone terminal 320-1 connected with the portable station position detector 380-1.

An example of the substitute incoming set table is illustrated in FIG. 24. As illustrated in FIG. 24, the extension number of the substitute incoming is previously set and registered correspondingly, for example, like the state that the extension of the extension number "5000" is set to and registered as the substitute incoming destination with the substitute incoming set table for the portable station of the extension number "2000" and the extension of the extension number "6000" is set to and registered as the substitute incoming destination for the portable station of the extension number "2000" with the substitute incoming set table. Whether the portable station 380 is present or absent on the placing section 381 of the portable station position detector 380 is registered as the information of "presence" or "absence" with the table. In this third embodiment, it is assumed that the extension number "5000" is allocated to the wired telephone terminal 320-1 and the extension number "2000" is allocated to the portable station 370-1.

Referring to FIG. 23, a process to be executed at all times or arbitrarily (at each predetermined time) by a controller (CPU) in the portable station position detector 380 will be explained. In FIG. 22, it is assumed that the portable station 370-1 is placed on the placing section 381-1 of the portable station position detector 380-1. The controller first detects the state change of the placing section 381-1, for example, based on no change of the load to be applied to the placing section 381-1 at a step G1. If pressing of the switch is not detected in this case, the process at the step G1 is loop-processed at a predetermined period. If any state change is detected (step G1), the controller judges whether the portable station 370-1 previously allocated to the placing section 381-1 is placed or removed (step G2).

When the controller judges that the portable station 370-1 is placed on the placing section 381-1 based on an increase in the predetermined load, the controller informs the placing of the portable station 370-1 to the electronic exchange system 310 by using the line of the wired telephone 320-1 (step G3). However, this advice may be executed by the portable station 370-1 via the master unit. In the electronic exchange system 310 which receives the advice (substitute incoming destination registration advice) indicating that the portable station 370-1 is placed, its controller 314 sets a flag of "presence" at a position of presence information in an item corresponding to the extension number from the extension number "5000" of the wired telephone terminal 320-1 connected to the portable station position detector 380-1 of the substitute incoming set table of the storage section 315. The extension number "2000" is set as the extension number of the corresponding portable station 370-1 to the extension number "5000", and thus the wired telephone terminal of the extension number "5000" is set as the substitute incoming destination corresponding to the call incoming at the portable station 370-1 of the extension number "2000".

When removal of the portable station 370-1 from the placing section 381-1 is judged at the step G2, the removal of the portable station 370-1 is informed to the electronic exchange system 310 by using the line of the wired telephone terminal 320-1 (step G4). The electronic exchange system 310 sets the flag of presence information corresponding to the wired telephone terminal 320-1 of the substitute incoming set table to "absence" in response to the reception of this advance (substitute incoming destination cancel advice). Thus, the wired telephone terminal 320-1 set as the substitute incoming destination corresponding to the call incoming at the portable station 370-1 is canceled.

Then, when incoming at the portable station 370-1 occurs, a process to be executed by the controller 314 of the private branch electronic exchange system 310 will be explained with reference to FIG. 25. The controller 314 first determines presence or absence of the portable station 370-1 on the placing section 381-1 by referring to the substitute incoming set table (step H2) when the incoming at the portable station 370-1 occurs (step H1). Necessity or not of the substitute incoming is judged from the presence information of the portable station 370-1 in this table, and the incoming is processed.

When the presence information is "present", the substitute incoming is necessary, and hence the controller 314 so controls as to connect the termination call to the corresponding substitute destination extension number "5000" of the substitute incoming set table (step H3). As a result, the incoming at the portable station 370-1 can be transferred to the wired telecommunication terminal 320-1 set as the substitute destination extension number, and even when the communication channel of the portable station 370-1 is busy and scarcely connected, the incoming is transferred to the substitute destination extension, and hence the incoming is facilitated to be able to talk.

When the presence information is "absent", the substitute incoming is not necessary, and hence the controller 314 controls ordinary incoming at the portable station 370-1 (step H4).

According to the third embodiment of the present invention, when the wired telephone 320 exists in the vicinity in an environment where both the wired telephone 320 and the wired telephone terminal 370 exist, the incoming at the portable station 370 can be automatically substituted for the wired telephone 320 having excellent serviceability and operability, thereby improving convenience of the incoming talking service.

As described above, the specific portable station 370 is corresponded to the extension of the specific wired telephone terminal 320. Further, the wired telephone terminal 320 is provided with the detector 380 for detecting whether the portable station 370 is placed or not on the placing section 381 by providing the placing section 381 for the portable station. When the portable station 370 is placed in the detector 380, the incoming at the corresponding specific portable station 370 is executed at the wired telephone terminal 320 connected with the detector 380.

In this case, the system may be simplified, but the extension number in which the automatic substitute incoming is enabled is limited. Therefore, a modified example in which general availability is provided and the incoming at its own portable station can be automatically substitute-income even at the wired telephone terminal of any extension number will be explained.

This modified example is so constructed that the contents of the presence information and the substitute incoming destination number corresponding to the extension number of the table set to the storage section 315 can be rewritten by the controller 314 of the electronic exchange system 310. When the incoming occurs at the portable station 370 according to the processing flow illustrated in FIG. 25 described above, necessity or not of the substitute incoming is judged from the presence information of the portable station 370 by referring to the table of FIG. 24, and the incoming is processed.

In this case, even in the modified example, the portable station position detectors 380 are respectively connected to the wired telephone terminals 320 of the desired extension numbers. However, the portable station position detector 380 has a function for instructing a command of transmitting the specific inquiry code and the identification information to the portable station 370 placed in the placing section 381 as an operation when the portable station 370 is placed in the placing section 381 via weak radio wave. Further, the portable station position detector 380 has a function for so sending the substitute incoming transition request and the received extension number information to the controller 314 of the electronic exchange system 310 as to convert the incoming to the portable station to the substitute incoming upon reception of the extension number information (e.g., a combination of the specific code and the extension number) as the information of the inquiry reply transmitted from the portable station 370 in response to the command.

The controller 341 of the electronic exchange system 310 which receives the substitute incoming conversion request and the extension number information has a function for setting the extension number of the wired telephone terminal 320 connected with the portable station position detector 380 which generates the substitute incoming conversion request to the substitute incoming destination number of the column corresponding to the extension number of the portable station placed in the portable station position detector 380 which generates the substitute incoming conversion request of the substitute incoming set table divided according to the extension number of the portable station 370 in the substitute incoming set table of the storage section 315. Further, the portable station 370 has a function for transmitting the extension number information with the own extension number information as the inquiry replay information upon reception of the inquiry command from the portable station position detector 380 via weak radio wave.

In the structure as described above in FIG. 22, it is assumed that the portable station 370-1 set to the extension number "2000" is placed in the placing section 381-1 of the portable station position detector 380-1. The controller in the portable station position detector 380 always or arbitrarily monitors whether the portable station is placed in the placing section 381-1 or not according to the processing flow illustrated in FIG. 23. When the change of the monitored state due to the placing of the portable station 370-1 in the placing section 381-1 is detected, the portable station position detector 380-1 instructs a command of transmitting the specific inquiry code and the extension number information to the portable station 370-1 via weak radio wave.

The extension number information is transmitted as the information of the inquiry reply from the portable station 370-1 in response to the command.

The portable station position detector 380-1 so sends the substitute incoming conversion request and the received extension number information to the controller 314 of the electronic exchange system 310 as to convert the incoming to the portable station 370-1 to the substitute incoming upon reception of the extension number information as the information of the inquiry replay sent from the portable station 370-1.

The controller 314 of the electronic exchange system 310 which receives the substitute incoming conversion request and the extension number information sets the extension number "5000" of the wired telephone terminal 320-1 connected with the portable station position detector 380 which generates the substitute incoming conversion request to the column of the substitute incoming destination number of the column of the substitute incoming destination number of the extension number of the portable station 370-1 of the substitute incoming set table in the storage section 315 (in the column corresponding to the extension number "2000" of the extension number of the portable station 370-1). Further, "presence" is set to the column of the presence information.

As described above, the wired telephone terminal 320-1 of the extension number "5000" is set as the substitute incoming destination corresponding to the call incoming at the portable station 370-1 of the extension number "2000". When incoming at the portable station 370-1 occurs, the controller 314 of the private branch electronic exchange system 310 first determines presence or absence of the portable station 370-1 by referring to the substitute incoming set table according to the processing flow illustrated in FIG. 25 as described, judges necessity or not of the substitute incoming from the presence information of the portable station 370-1 in this table, and processes the incoming.

In this case, since the presence information illustrating presence on the placing section 381-1 is "present" and hence the necessity of the substitute incoming is present, the controller 314 so controls as to connect the termination call to the corresponding substitute destination extension number "5000" in the substitute incoming set table. As a result, the incoming at the portable station 370-1 can be transferred to the wired telephone terminal 320-1 set as the substitute destination extension number, and even if the communication channel of the portable station 370 is busy and scarcely connected, the incoming is transferred to the substitute destination extension number, and the incoming is facilitated to be able to talk.

Further, in the case of the modified example, even if any portable station 370 is placed at any portable station position detector 380, the incoming at the placed portable station 370 is executed at the wired telephone terminal 320 of the extension number corresponding to the portable station position detector 380 placed with the portable station 370. Thus, when the user of the portable station 370 places the own portable station 370 in the nearest portable station position detector 380 of the moved place, the incoming can be executed at the wired telephone terminal 320 connected with the nearest portable station position detector 380. Therefore, the incoming at the portable station becoming scarcely connected due to the fact that the radio communication channel (speech channel) is busy by the traffic state can be easily connected to the other party of the object by a simple operation.

In the above third embodiment, the incoming at the wired telephone terminal may be substituted an incoming at the portable station placed with the wired telephone terminal. Furthermore, in place of the placing section 381, the wired telephone terminal may include detector, e.g. infrared detector, ultrasonic detector and weak radio wave detector, to detect that the portable station is place at the wired telephone terminal.

According to the third embodiment of the present invention, there is provided an electronic exchange system in which the incoming at the portable station can be converted to the substitute incoming at the wired telephone terminal by the simple operation, its cancel is simple and forgetting of the cancel can be prevented.

Then, a fourth embodiment of the present invention will be explained with reference to FIGS. 26 to 29. An electronic exchange system according to the fourth embodiment of the present invention is similar in the fundamental structure to the electronic exchange system 100 illustrated in FIG. 1 described above and, therefore, the detailed description of the constituents will be omitted.

The electronic exchange system 400 comprises a private branch electronic exchange system (PBX) 410, multi-function telephones 420 (420-1 to 420-i) of wired extension terminals, public telecommunication network 430 (430-1 to 430-j) of cable conductors for connecting a central telephone electronic exchange system to the electronic exchange system 410, leased lines or private lines 440 (440-1 to 440-k), cell stations 450 (450-1 to 450-m), a control terminal 460, and portable stations 470 (470-1 to 470-n) of radio slave units for the cell stations, where i, j, k, m and n are arbitrary real numbers. The electronic exchange system 410 has a controller 414 for controlling the electronic exchange system 410, and a storage section 415 for storing various data and programs.

Since the portable station 470 of the electronic exchange system 400 is disposed out of the calling area and the portable station 470 is in the power-off state, if the portable station 470 is call failed, a timer until an outer process is executed is shortened, thereby improving the operability of the calling originator. In this case, the outer process includes the transfer process, the connecting process to the talkie, the registering process with the table of the storage section and the disconnecting process to the transmitting origin described with respect to the first to third embodiments described above.

An example of the table for managing a timer value of the portable station 470 until the outer process is executed when there is incoming call no answer to the incoming at the portable station 470 is illustrated in FIG. 26, and the table for managing number of incoming call no answers (number of incoming failures) at each portable station 470 is illustrated in FIG. 27. These tables are provided in the storage section 415 of the electronic exchange system 410. The table illustrated in FIG. 26 shows that, when the number of the incoming call no answers of the portable station 470 is less than five times, the timer value is set to 15 sec., when the number of the incoming call no answers is five times to less than ten times, the timer value is set to 5 sec., and when the number of the incoming call no answers is ten times, the portable station 470 is not called, but a predetermined outer process is executed.

The table illustrated in FIG. 27 stores numbers of incoming call no answers at the respective portable stations 470. For example, the number of the incoming call no answers of the portable station allocated with extension number "1000" is "0", and the number of the incoming call no answers of the portable station allocated with extension number "1001" is "1". Then, referring to FIGS. 28 and 29, an operation of the controller 414 of the electronic exchange system 410 according to the fourth embodiment of the present invention will be explained. In this case, it is assumed that incoming occurs at the portable station 470-1 and extension number "1000" is allocated to the portable station 470-1.

First, when incoming occurs at the portable station 470-1, the controller 414 of the electronic exchange system 410 refers to the number of the incoming call no answers stored in the storage section 415 and reads the number of the incoming call no answers corresponding to the portable station 470-1 (steps I1 and I2). The number of the incoming call no answers of the portable station 470-1 is "0" as illustrated in FIG. 27. Further, the controller 414 reads the timer value by referring to the table illustrated in FIG. 26 by using the read number of the incoming call no answers (step I3). Since the portable station 470-1 has "0" of the number of the incoming call no answers, the read timer value becomes 15 sec. When the read timer value is "0" sec., i.e., when the number of the incoming call no answers is ten times or more, the outer process is executed without calling the portable station of the object to be income (steps I4 and I5).

When the read timer value is "1" sec or more, the controller 414 sets the calling time of the portable station to the timer value (step I6). The calling time of the portable station 470-1 is set to 15 sec. Thereafter, the electronic exchange system 410 starts incoming at the portable station 470-1, and judges whether there is an answer within the set calling time or not (steps I7 and I8). In this case, if incoming call no answer is obtained from the portable station 470-1 within the calling time, the controller 414 increments by one the number of the incoming call no answers corresponding to the portable station 470-1 of the incoming call no answer managing table (step I9). More specifically, the number of the incoming call no answers of the portable station 470-1 registered with the incoming call no answer number managing table is altered from "0" to "1". Thereafter, the electronic exchange system 410 executes the outer process (step I5).

When there is an answer from the portable station 470-1 within the calling time, the set timer value is cleared and the number of the incoming call no answers of the portable station 470-1 of the incoming call no answer managing table is cleared (steps I10 and I11). Incidentally, since the number of the incoming call no answers of the portable station 470-1 was originally "0", the number of the incoming call no answers is not altered as it is. The electronic exchange system 410 thereafter executes a call connecting process for forming a communication channel between the terminal of the calling originator (transmitting origin) and the portable station 470-1 (step I12).

According to the process described above, the time until the outer process is executed, i.e., the calling time can be controlled based on the number of the incoming call no answers. Therefore, the calling originator who requests a plurality of times of connections to the portable station 470 of a communication disabling state is always not waited for a predetermined time until the outer process is started by the electronic exchange system 410. Therefore, the operability and the serviceability of the calling originator can be improved.

Figure 29:
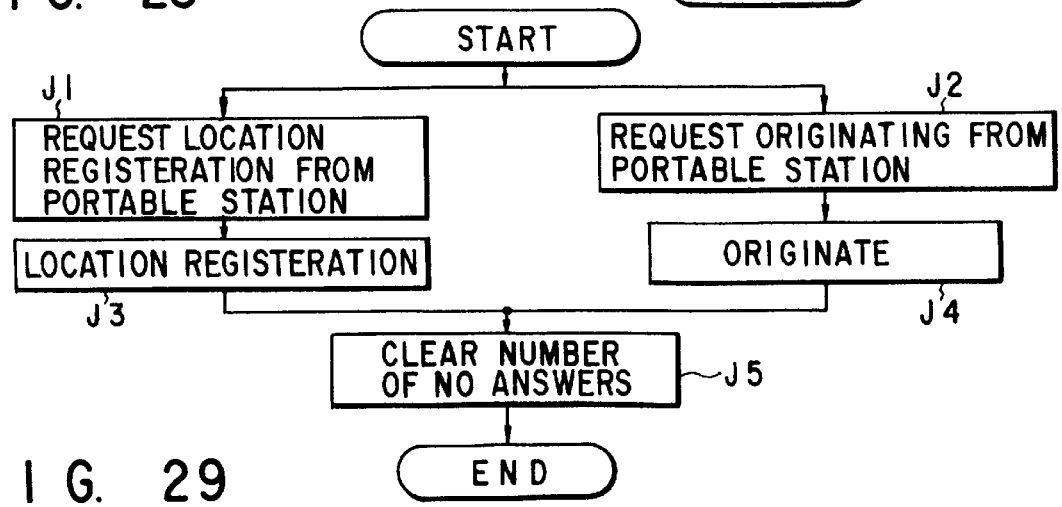
FIG. 29 is a flow chart showing the operation of the electronic exchange system in response to a service request from a portable station of the fourth embodiment.

Processes of the controller 414 of the case where a location registration request is, for example, sent from the portable station 470 to the electronic exchange system 410 or the case where an originating request is obtained from the portable station 470 will be explained with reference to FIG. 29.

When the controller 414 receives a location registration request from an arbitrary portable station 470, the controller 414 executes the position registering process responsive to the request, and then clears the corresponding number of the incoming call no answers in the incoming call no answer number managing table illustrated in FIG. 27 (steps J1, J3 and J5). For example, when the portable station 470-2 allocated to a portable station number 1010 is converted from a communication disabling state to a communication enabling state and a location registration request is sent, the controller 414 receives the request, executes corresponding location registration process and resets the number of the incoming call no answers "5" registered with the incoming call no answer number managing table to "0".

Further, when the controller 414 receives the originating request from an arbitrary portable station 470, the controller 414 executes the originating process responsive to the request, and clears the corresponding number of the incoming call no answers in the incoming call no answer number managing table (steps J2, J4 and J5). For example, when the portable station 470-3 allocated to a portable station number 1011 is converted from a communication disabling start to a communication enabling state and an originating request is sent, the controller 414 receives this request, executes the corresponding originating process, and resets the number of the incoming call no answers "10" registered with the incoming call no answer number managing table to "0". According to the process as described above, the timer value controlled shortly due to the incoming call no answer, i.e., the calling time is returned to a standard calling time (timer value: 15 sec.)

Therefore, the calling time of this fourth embodiment to the outer process of each portable station 470 is set to the standard calling time at the time of location registration request from the portable station 470, originating request or responding to the termination call.

According to the fourth embodiment of the present invention as described above, when the portable station 470 is disposed out of the calling area, or the portable station 470 is call-failed since the portable station 470 is in the power-off state, the operability of the calling originator is improved by shortening the timer until the outer process is executed.

Then, a fifth embodiment of the present invention will be explained with reference to FIGS. 30 to 33.

In the first to third embodiments described above, if incoming call no answer is obtained until a predetermined time is elapsed, a telephone number (extension number) allocated to the calling originator of the termination call and information regarding the termination call such as a termination call occurring time or the like are stored in a table provided in a predetermined storage area. When the portable station becomes a state capable of communicating with the electronic exchange system, the electronic exchange system automatically refers the table in response to any request from the portable station. When failure call regarding the portable station is registered with the table, information regarding the failure call is informed to the portable station or a call-back process is executed. The information informed to the portable station is displayed on a display unit such as an LCD.

As described above, services such as management (storage) of the information regarding the failure call, the call-back process are all firmly executed at the electronic exchange system side as a main leader. Therefore, the user of the portable station is feared that, when information except desired information is sent, or the communication disabling state occurs at the time of power-on state of the portable station, an inconvenient state such as call-back process always occurs even if not requested. The terminal of the calling originator to be connected by the call-back process is not always free.

Therefore, an electronic exchange system according to the fifth embodiment of the present invention is so constructed that the information stored in the storage section of the electronic exchange system in the embodiments described above is so held at the portable station side that the user of the portable station can originate to the calling originator at the time of communication disabling at a desired timing. Thus, the portable station can originate to the calling originator of failure call at a free timing by means of originating via an electronic notebook originating of an intrinsic function, memory dial originating function and operation.

The electronic exchange system according to the fifth embodiment of the present invention is similar in the fundamental structure to the electronic exchange system 100 illustrated in FIG. 1. Therefore, the detailed description of the constituents will be omitted.

The electronic exchange system 500 comprises a private branch electronic exchange system (PBX) 510, multi-function telephones 120 (520-1 to 520-i) of wired extension terminals, public telecommunication network 530 (530-1 to 530-j) of cable conductors for connecting a central telephone electronic exchange system to the electronic exchange system 510, leased lines or private lines 540 (540-1 to 540-k), cell stations 550 (550-1 to 550-m), a control terminal 560, and portable stations 570 (570-1 to 570-n) of radio slave units for the cell stations, where i, j, k, m and n are arbitrary real numbers. The electronic exchange system 510 has a controller 514 for controlling the electronic exchange system 510, and a storage section 515 for storing various data and programs.

Each portable station 570 has a memory dial storage table 571 to be referred when various functions such as an electronic notebook originating is executed. The each portable station 570 has a character display function similar to the embodiments described above. More particularly, when the communication enabling state of the portable station 570 is informed by a location registration request or an originating request, information such as presence or absence of termination call information at the time of communication disabling, number of cases, calling originator is sent from the electronic exchange system 510 to the portable station 570 through an information channel. The portable station 570 displays the information on a display unit such as an LCD, for example, as illustrated in FIG. 13.

Further, the portable station 570 has functions for executing an inquiry regarding the termination call information to the electronic exchange system 510, receiving a retrieved result by the electronic exchange system 510 and displaying the result. Moreover, the portable station 570 has a memory dial originating function for receiving termination call information held by the electronic exchange system 510 via data transfer, storing the termination call information in the memory dial storage table 571, retrieving the incoming history as a portion of the process such as a telephone directory originating operation, and originating to the stored calling originator. The present invention is not limited to the particular embodiment. For example, the portable station 570 may store the termination call information received from the electronic exchange system 510 not in the memory dial storage table 571 but in a redialing table to be referred in the case of redialing.

The electronic exchange system 510 holds the information regarding the termination call at the time of communication disabling at each portable station 570, i.e. call information in the storage section 515 similarly to the electronic exchange systems of the embodiments described above. According to the fifth embodiment, as illustrated in FIG. 30, the call information held by the storage section 515 of the electronic exchange system 510 is sent to and received by the portable station 570. For example, the portable station 570 receives the call information temporarily held by the electronic exchange system 510 at the time of communication enabling, and so stores the call information in the memory dial storage table 571 as to be used in the memory dial originating function of the portable station 570. Therefore, the user of the portable station 570 can freely originate to necessary originator at a desired timing.

Then, an operation of the electronic exchange system 500 according to the fifth embodiment of the present invention is fundamentally similar to the operations of the second embodiment described above. First, as an example of the call information storage table stored in the storage section 515 of the electronic exchange system 510, FIG. 10 used in the case of the description of the second embodiment described above is employed. The registering process with the call information storage table due to generation of incoming call no answer can be executed similarly according to the flow chart of FIG. 11 used in the case of the description of the second embodiment described above.

The electronic exchange system 510 refers to the location information previously stored in the storage section 515 when incoming at an arbitrary portable station 570 (hereinafter referred to as "a portable station 570-1") occurs. The electronic exchange system 510 sends the incoming signal to the portable station 570-1 through the cell station 550 disposed in a calling area disposed at the portable station 570-1 according to the location information. The electronic exchange system 510 records the call information of the originating origin, and starts counting of the incoming incoming call no answer timer. In this case, if an answer signal is sent from the electronic exchange system 510-1 within a predetermined time, an ordinary call process is executed, while if the answer signal is not sent, occurrence of incoming incoming call no answer is recorded in the call information storage table.

Transfer of the call information from the electronic exchange system 510 to the portable station 570 is executed in a flow chart of FIG. 31. The flow chart illustrated in FIG. 31 is similar to the flow chart illustrated in FIG. 12 used in the description of the second embodiment described above. However, in the second embodiment described above, the call information according to the control of the electronic exchange system 510 is informed to the portable station 570 at the step D5. However, according to the fifth embodiment, all the call information stored in the storage section 515 are transferred to the portable station 570 at a step K5.

For example, the electronic exchange system 510-1 moves the calling area, and requests a location registration process to the electronic exchange system 510 through an arbitrary cell station 550 for serving the calling area by turning ON the power source. Thus, the controller 514 of the electronic exchange system 510 rewrites the location information of the electronic exchange system 510-1 with the calling area disposed at present (steps K1 and K2). The controller 514 determines whether incoming call no answer of the call occurs at the portable station 570-1 or not by referring to the call information storage table (step K3), and finishes the process if incoming incoming call no answer does not occur. In this case, if the incoming incoming call no answer occurs, the controller 514 informs a location registration end to the electronic exchange system 510-1, informs the location registration end to the electronic exchange system 510-1, reads the call information stored in the call information storage table (step K4) and transfers the call information to the electronic exchange system 510-1 (step K5).

The portable station 570-1 receives the call information via data transferring, and stores the call information in the memory dial storage table 571. Thus, the portable station 570-1 retrieves incoming history as a portion of the process of the telephone directory originating operation, and originates the memory dial to be originated to the stored originator. However, the present invention is not limited to the particular embodiment. For example, the call information may be stored not in the memory dial storage table 571 but in the redialing table, and originated to the calling originator by redialing.

The originating process of the memory dial of such a portable station 570 is illustrated in the flow chart of FIG. 32. The portable station 570 reads the information stored in the memory dial storage table 571 in response to depressing when a functional key previously set is depressed by the user (step L1). In this case, information as illustrated in FIG. 33 is displayed on a display unit such as an LCD. Call information of two cases are displayed in FIG. 33, and it is understood from FIG. 33 that the first case generates incoming at 13:00 from the terminal user of extension number "4000" and the second case generates coming at 14:25 from the terminal user of extension number "5010". The user of the portable station 570 refers to the display, and selects a head memory dial number to be displayed on the display unit (and selects No. 1 in the case of the first case or No. 2 in the case of the second case of the above-described call information) at a step L2. This selecting process can select the number, for example, by inputting the number by a dial pad or moving a cursor by a key for moving the cursor. Thereafter, when an originating button is pressed by the user, the memory dial originating is executed to the number of the originating terminal (calling originator) selected from the portable station 570 (step L3).

According to the process described above, the user of the portable station can originate to the calling originator at the time of communication disabling or to the calling originator of failure call by telephone directory originating or memory dial originating function and operation at a free timing.

According to the fifth embodiment described above, the user of the portable station so transfers the call information stored in the storage section of the electronic exchange system to the portable station at the time of communication disabling as to originate to the calling originator at a desired timing. The portable station stores the transferred call information in the memory dial storage table or the redialing table. Thus, the user can retrieve the incoming history as a portion of the process such as portable station, telephone directory originating operation, and can execute the memory redialing originating or redialing originating to the stored originator. Therefore, the user can originate to the calling originator of failure call at a free timing, thereby improving so serviceability and operability to the portable station user.

According to the electronic exchange system of the present invention as described above, when the answer signal from the portable stations not received within the predetermined time after the incoming signal is sent to the portable station, the incoming call is connected by the call-back when the service is provided initially to the portable station. Therefore, the state that the communication with the user of the portable station cannot be executed can be reduced, and further service of the electronic exchange system for containing the portable station can be improved.

According to the electronic exchange system of the present invention, when the answer signal from the portable station is not received within the predetermined time after the incoming signal is set to the portable station, the information regarding the income call is informed to the portable station thereafter when the service is provided initially to the portable station. Therefore, the state that the communication with the user of the portable station is not executed can be reduced, and the service of the electronic exchange system for containing the portable station can be further improved.

According to the electronic exchange system of the present invention, the presence of the portable station is automatically detected and its result is informed to the electronic exchange system thereby to automatically determine whether the incoming is executed at the portable station or the wired telephone thereby to switch the incoming destination. THerefore, incoming at the user of the portable station can be easily connected to the user himself, thereby improving operability and speech service.

According to the electronic exchange system of the present invention, when the portable station is call-failed since the portable station is disposed out of the calling are or in the power-off state, the timer until the outer process is executed is shortened, thereby improving operability to the calling originator.

According to the electronic exchange system of the present invention, the information stored in the storage section of the electronic exchange system is so held at the portable station side as to originate to the originator at the time of communication disabling by the user of the portable station at a desired timing. Therefore, the portable station can originate to the originator of failure call by telephone directory originating, memory dial originating function and operation of intrinsic functions at a free timing, thereby improving serviceability for the user of the portable station.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic exchange system adapted to be connected to portable stations via a radio channel, the system comprising:

means for transmitting an incoming call signal to a called portable station in response to a call request to the called portable station;

means for detecting that a called portable station is unusable if the called portable station does not respond to the incoming call signal within a given waiting time;

means for storing the number of times when said detecting means detects that said called portable station is unusable;

control means for executing a predetermined process when said detecting means detects that the called portable station is unusable; and means for changing a time period of said given waiting time for each of said portable stations based on the number of times stored in said storing means.

2. An electronic exchange system according to claim 1, wherein said electronic exchange system is a private electronic exchange system connected to at least an office line of a public telecommunication network.

3. An electronic exchange system according to claim 1, wherein said predetermined process executed by said control means is a transfer of a call to a predetermined substitution terminal of the called portable station.

4. An electronic exchange system according to claim 1, wherein said predetermined process executed by said control means is a disconnection of a call.

5. An electronic exchange system according to claim 1, wherein said predetermined process executed by said control means is a transfer of a call to a talkie.

6. A method of controlling an electronic exchange system having a plurality of portable stations and a memory section comprising the steps of:

a) determining a call to be unsuccessful if the system receives a call to any of the plurality of portable stations and transmits a call signal to the portable station but does not receive an answer within a predetermined period of waiting time;

b) storing the number of times of incoming call no answer situations of the portable station according to the result of the determination process in the step a);

c) carrying out a control process for the calling terminal depending on the result of the determination process in the step a); and d) altering the predetermined period of waiting time as a function of the number of times of incoming call no answer situations stored in the memory section for each of the portable stations.

* * * * *